US012775619B1

(12) United States Patent
Aggarwal et al.

(10) Patent No.: US 12,775,619 B1
(45) Date of Patent: Oct. 27, 2026

(54) TRANSFORM AI JOIN TASK TO AI CLASSIFICATION

(71) Applicant: Snowflake Inc., Bozeman, MT (US)

(72) Inventors: Paritosh Aggarwal, San Carlos, CA (US); Nitish Jindal, Bellevue, WA (US); Aurick Qiao, Pittsburgh, PA (US); Jay S. Tayade, Redmond, WA (US); Dimitrios Tsirogiannis, Belmont, CA (US); Nathan M. Wiegand, Austin, TX (US); Jianjian Xie, Los Altos, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/320,537

(22) Filed: Sep. 5, 2025

(51) Int. Cl.

| | |
|---|---|
| ***G06F 16/00*** | (2019.01) |
| ***G06F 16/2453*** | (2019.01) |
| ***G06F 16/28*** | (2019.01) |

(52) U.S. Cl.
CPC ...... *G06F 16/24544* (2019.01); *G06F 16/285* (2019.01)

(58) Field of Classification Search
CPC ........................ G06F 16/24544; G06F 16/285
USPC ........................................................ 707/714
See application file for complete search history.

*Primary Examiner* — Raquel Perez-Arroyo
(74) *Attorney, Agent, or Firm* — Schwegman Lundberg & Woessner, P.A.

(57) ABSTRACT

A method is provided for optimizing query performance by transforming an artificial intelligence (AI) join task into an AI classification task. The method comprises receiving a request to join a first table and a second table using an AI filter applicable to values of a first column of the first table and a selected column of the second table. A modified query is generated to perform the join with the AI classification task by performing, for each row in the first table, the AI classification function with the value from the first column and the values from the selected column. The AI classification function is configured to determine, in a single inference call, which candidate values from the selected column that are relevant to the value from the first column in the row. The method also includes performing the modified query and outputting a result from performing the modified query.

20 Claims, 14 Drawing Sheets

TRANSFORM AI JOIN TASK TO AI CLASSIFICATION

TECHNICAL FIELD

The subject matter disclosed herein generally relates to methods and systems for improving the performance of database queries that include Artificial Intelligence (AI) join operations.

BACKGROUND

In many modern database systems, AI-driven predicates are integrated directly into SQL queries to provide advanced data analysis capabilities, enabling users to apply semantic filtering and classification without the need for external data processing pipelines. However, conventional implementations typically apply these functions on a per-row-pair basis, requiring separate model inferences for each combination of rows between joined tables.

This approach not only overwhelms computational resources but also fails to address the performance demands of large-scale data environments, especially when query complexity and data volume grow.

In one aspect, the problem is the high complexity of naive join strategies, whereby using a language model for each pair of rows between a large dataset and a smaller set of labels leads to exponential increases in latency and operational cost. As a result, the repetitive use of the AI service places a heavy burden on query execution pipelines and significantly slows down interactive data analysis. In scenarios where low-latency responses are necessary, such inefficiencies hinder the practical use of AI-based joins and fail to meet user expectations for responsive, real-time insights.

The impact of these limitations is significant for organizations seeking to embed semantic insights directly within their database engines. Without a streamlined mechanism to manage AI model inputs, users face a choice between degraded performance and diminished analytical accuracy. This leads to high execution costs that deter the widespread adoption of native AI classification, resulting in fragmented systems and increased data movement overhead.

BRIEF DESCRIPTION OF THE DRAWINGS

Various appended drawings illustrate examples of the present disclosure and cannot be considered limiting its scope.

DETAILED DESCRIPTION

Figure 1:
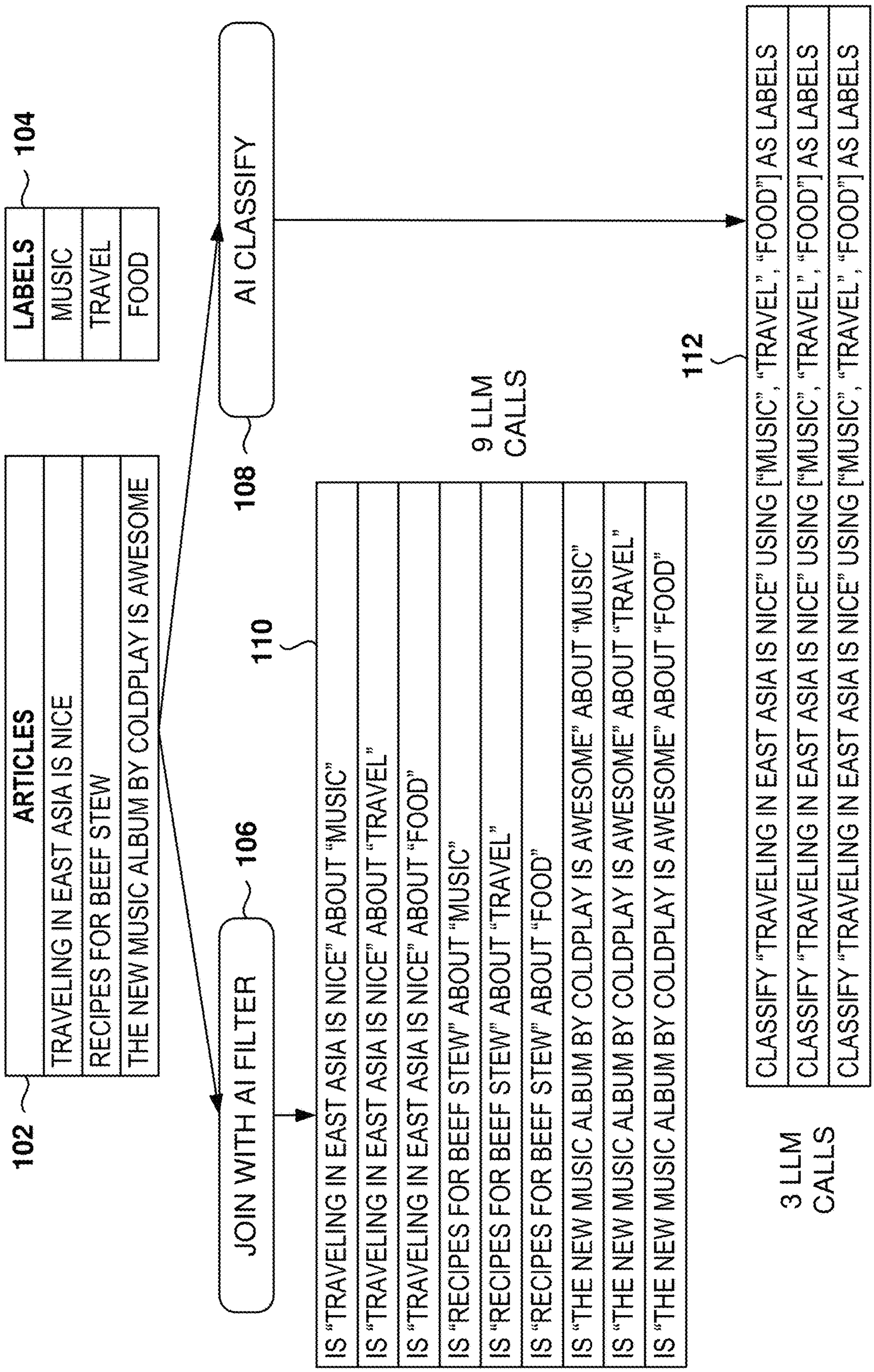
FIG. 1 illustrates a comparison of the operations for performing a join using an AI filter for each article and label versus using an AI classification for each article, according to some examples.

Example methods, systems, and computer programs described herein are directed at transforming an AI join task to an AI classification task. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

A technical solution presented herein addresses the inefficiency of join operations in database systems that use AI-based filters, particularly large language models (LLMs), for classification tasks within SQL queries. The solution reframes the join operation as a classification problem, enabling the system to batch multiple candidate labels or sentiments and evaluate them in a single model inference call, rather than performing a separate call for each possible pair of rows in the joined tables.

The solution includes identifying queries that comprise AI filters acting as predicates. These AI filters typically determine whether a particular label, such as a sentiment, applies to a given data row, such as a review. The system analyzes the query to detect categorical columns, which are suitable for batching. A heuristic is applied during query compilation to sample the underlying table and determine if a column contains categorical values. In some examples, the heuristic uses an LLM call to classify the column type and guides the query plan rewrite based on the sampled values.

Once a suitable query is identified, the system constructs a new query plan that batches candidate labels. For each review, the system generates a batch of sentiments that can fit within the LLM's context window. In some examples, the batch size is adaptively calculated based on the maximum number of tokens that the LLM can process, the size of the categorical column, and system-reserved tokens.

The rationale behind the solution is that batching candidate labels for classification leverages the LLM's ability to process multiple options in a single context window, reducing computational cost and latency. This approach is supported by experimental results indicating improved performance and classification quality when fewer labels are processed per batch.

For purposes of illustration, the specification may refer to examples involving classifying 'reviews' with 'sentiments' or 'articles' with 'topics'. However, these are merely examples, and the disclosed methods and systems are applicable to any join between a first table and a second table where an AI-based filter can be transformed into a classification or batch evaluation task.

Some of the concepts used for the description of the solution are presented below.

An AI classification function includes a computational process, model, or algorithm configured to evaluate a data input from a first table against a list of candidate values from a second table and, in a single inference call, determine which candidate values are relevant to the data input.

An AI filter includes a function, operator, or algorithm that applies artificial intelligence techniques to compare values from two columns, e.g., data from different tables, and returns a result indicating whether a specified relationship exists between the values.

A batch includes a subset of candidate values from a column, grouped for simultaneous processing by an AI classification function, e.g., sized to fit within the context window of the model.

A candidate value includes an individual entry or data element from a selected column of a table, considered as a possible match or classification target in the context of an AI classification or join operation.

Categorical data includes data values that represent discrete categories, labels, or classes, suitable for grouping and classification tasks within a database or query operation.

A context window includes the maximum number of tokens or data elements that an AI model or classification function can process in a single inference call.

A join operation includes a database process that combines rows from two or more tables based on a specified relationship between columns, producing a unified result set.

A list of candidate values includes an aggregated collection of distinct values from a selected column, used as input for the AI classification function to determine relevance to a given data input.

A modified query includes a rewritten or transformed database query that replaces an AI filter for a join operation with an AI classification task.

A relevant candidate value includes a candidate value from a selected column that is determined, by the AI classification function, to be associated with or applicable to data input from another table.

A system-reserved token includes a portion of the context window or computational resources allocated for system operations that are not available for user data or prompt expressions.

FIG. 1 illustrates a comparison of the operations for performing a join using an AI filter for each article and label versus using an AI classification for each article, according to some examples.

AI functions are implemented directly within SQL, allowing users to write queries that join two tables and evaluate an AI filter as a predicate. The AI filter operates similarly to a standard predicate but invokes a model to process the request and return a result. For example, an expression evaluates whether the value of a column in an articles table 102 matches the value of a column in a table 104, with the AI filter processing each result. For every row in the join, the predicate is evaluated, returning true or false. Rows with a TRUE result are included in the output, while rows with a FALSE result are excluded.

Regular predicates operate on standard columns, such as integers, and evaluate expressions directly, for example, checking if a column value equals two. In contrast, the AI filter works by analyzing context, such as text, to determine an answer. For instance, the filter can assess whether a review contains a bad sentiment by examining the text, without explicit classification. In one example, the AI function is used to determine if a sentiment is positive, negative, or neutral, and the model is called to obtain this information and return the result.

In the illustrated example, the articles table 102 stores textual data entries such as "Traveling in East Asia is nice," "Recipes for beef stew," and "The new music album by Coldplay is awesome." The labels table 104 stores categorical labels, for example, "Music," "Travel," and "Food," which serve as classification targets for the articles in the articles table 102.

The task is to determine which labels apply to each article. In the traditional approach, represented by the join-with-AI-filter operation 106, the system evaluates each possible combination (as shown in table 110) of rows from the articles table 102 and the labels table 104. For each article-label pair, an AI filter function is invoked to determine whether a particular label applies to a given article. For instance, the system executes inference to evaluate whether "Traveling in East Asia is nice" pertains to "Music," to "Travel," or to "Food." Similarly, the system evaluates the applicability of "Recipes for beef stew" and "The new music album by Coldplay is awesome" against each label in table 104. As a result, this method includes nine separate large language model (LLM) calls, as each of the three articles is paired individually with each of the three labels. In this case, the number of calls will be O(n×m), where n is the number of rows in table 102 and m is the number of rows in the table 104.

Another approach is to use an optimized method, represented by the AI classify operation 108, which reframes the join task as a classification problem. Rather than performing an inference for each article-label combination, the system processes each article with a single request by supplying the complete set of labels from table 104 as input to the AI model. For instance, the model classifies "Traveling in East Asia is nice" against the labels "Music," "Travel," and "Food" in one LLM call. Similarly, "Recipes for beef stew" and "The new music album by Coldplay is awesome" are classified in separate, individual calls. As a result, the total number of LLM invocations is reduced to three, as shown in table 112, leading to a significant improvement in computational efficiency. In this case, the number of calls will be O(n), because one call is made for each row in table 102.

The original process is computationally expensive, so the approach is to reduce the number of calls by reframing the query as a classification problem. Instead of making n·m calls, the system provides a list of sentiments for each review and determines which sentiments apply in a single call. The AI classifier identifies applicable sentiments for each review, reducing the number of calls to the number of article reviews.

The solution includes rewriting the query to treat the join as a classification problem, with separate approaches for inner and outer joins. Although the underlying process uses the classifier, the implementation details differ for each join type. Customers can write their own queries or use the AI filter query, which is internally reconstructed. For each review, referred to as articles in this example, batches of sentiments are created. If the sentiments fit within the LLM's context window, the sentiments are processed together. If the batch size exceeds the model's constraints, the system cannot process all the sentiments in one call, requiring further handling due to context window limitations.

By reducing the number of LLM calls (from nine to three in this example), the classification-based approach minimizes computational overhead and latency, rendering the approach more suitable for large-scale data environments. Moreover, this transformation leverages the capacity of LLMs to process multiple labels within a single context window, thereby optimizing resource utilization and improving overall query performance.

Figure 2:
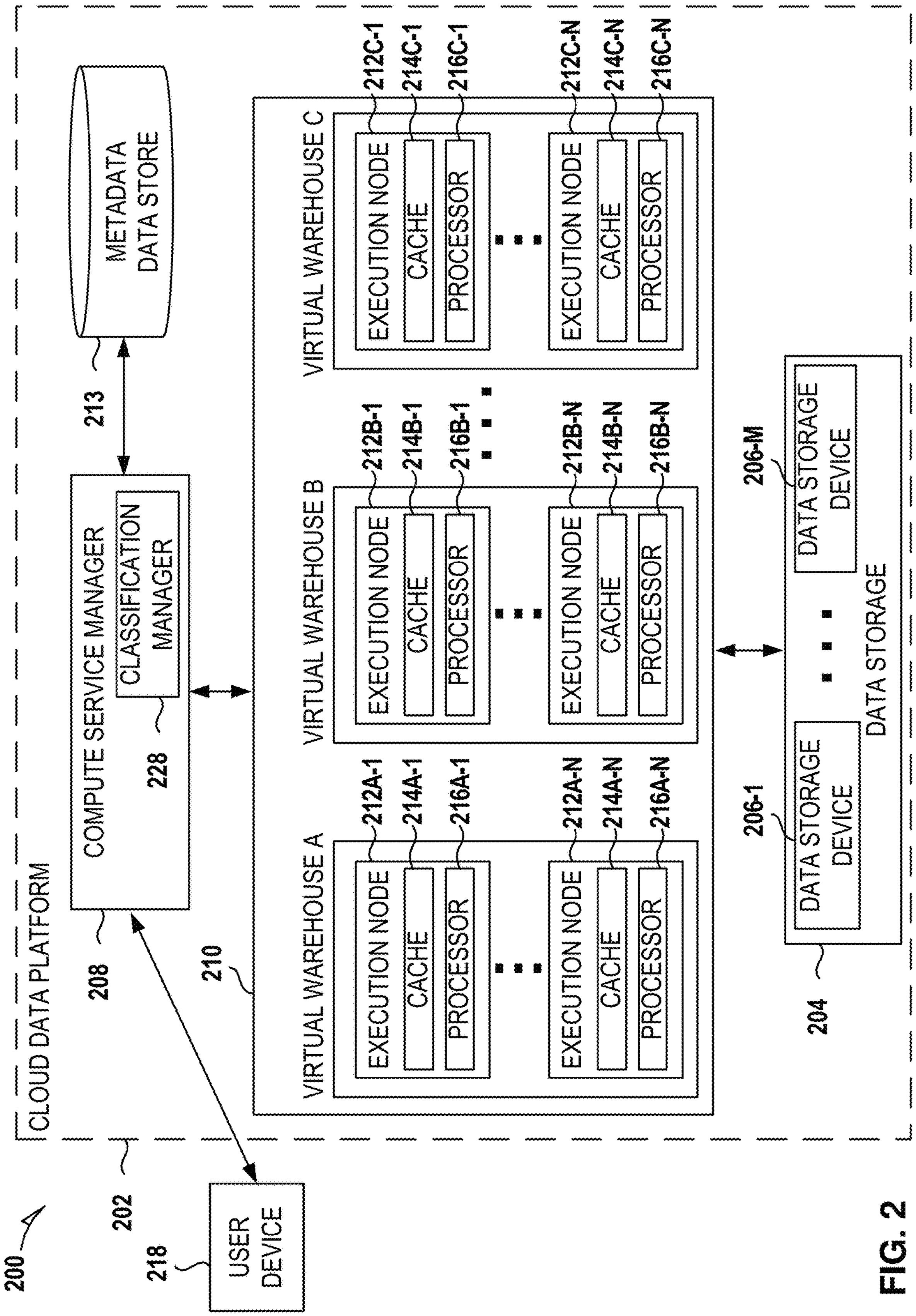
FIG. 2 is a computing environment that includes a cloud data platform, according to some examples.

FIG. 2 illustrates a computing environment 200 that includes a cloud data platform 202 (CDF), according to some examples. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the computing environment 200 to facilitate additional functionality that is not specifically described herein.

As shown, the cloud data platform 202 comprises a three-tier architecture: a compute service manager 208 coupled to a metadata data store 213, an execution platform 210, and data storage 204. The cloud data platform 202 hosts and provides data access, management, reporting, and analysis services to multiple client accounts. Administrative users can create and manage identities (e.g., users, roles, and groups) and use permissions to allow or deny access to the identities to resources and services. The cloud data platform 202 is used for reporting and analysis of integrated data from one or more disparate sources, including storage devices within the data storage 204. The data storage 204 comprises a plurality of computing machines and provides on-demand data storage resources to the cloud data platform 202.

The compute service manager 208 includes multiple services that coordinate and manage operations of the cloud data platform 202. For example, the compute service manager 208 is responsible for performing query optimization and compilation as well as managing clusters of compute nodes that perform query processing (also referred to as "virtual warehouses"). The compute service manager 208 can support any number of client accounts, such as end users providing data storage and retrieval requests, system administrators managing the systems and methods described herein, and other components/devices that interact with compute service manager 208.

The compute service manager 208 is also coupled to the metadata data store 213. The metadata data store 213 stores metadata pertaining to various functions and aspects associated with the cloud data platform 202 and its users. The metadata data store 213 also includes a summary of data stored in data storage 204, as well as data available from local caches. Additionally, the metadata data store 213 includes information regarding how data is organized in the data storage 204 and the local caches.

The compute service manager 208 is in communication with a user device 218. The user device 218 corresponds to a user of one of the multiple client accounts supported by the cloud data platform 202. In some implementations, the compute service manager 208 does not receive any direct communications from the user device 218 and only receives communications concerning jobs from a queue within the cloud data platform 202.

The compute service manager 208 is coupled to the metadata data store 213. The metadata data store 213 stores metadata pertaining to various functions and aspects associated with the cloud data platform 202 and its users. The metadata data store 213 also includes a summary of data stored in data storage 204, as well as data available from local caches. Additionally, the metadata data store 213 includes information regarding how data is organized in the data storage 204 and the local caches.

The compute service manager 208 is further coupled to the execution platform 210, which includes multiple virtual warehouses (computing clusters) that execute various data storage and data retrieval tasks. As an example, a set of processes on a compute node executes at least a portion of a query plan compiled by the compute service manager 208. As shown, the execution platform 210 includes virtual warehouse A, virtual warehouse B, and virtual warehouse C. Each virtual warehouse includes multiple execution nodes, each with a data cache and a processor. For example, as shown, virtual warehouse A includes execution nodes 212A-1 to 212A-N; execution node 212A-1 includes a cache 214A-1 and a processor 216A-1; and execution node 212A-N includes a cache 214A-N and a processor 216A-N. Similarly, in this example, virtual warehouse B includes execution nodes 212B-1 to 212B-N; execution node 212B-1 includes a cache 214B-1 and a processor 216B-1; and execution node 212B-N includes a cache 214B-N and a processor 216B-N. Additionally, virtual warehouse C includes execution nodes 212C-1 to 212C-N; execution node 212C-1 includes a cache 214C-1 and a processor 216C-1; and execution node 212C-N includes a cache 214C-N and a processor 216C-N.

Each execution node of the execution platform 210 is configured to process data storage and retrieval tasks. Hence, the virtual warehouses can execute multiple tasks in parallel, utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 210 are stateless with respect to the data that the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 210 may include any number of virtual warehouses. Additionally, the number of virtual warehouses in the execution platform 210 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 2 includes three execution nodes, a particular virtual warehouse may include any number of execution nodes. Further, the number of execution nodes in a virtual warehouse is dynamic, such that new execution nodes are created when additional demand is present, and existing execution nodes are deleted when the nodes are no longer necessary. Additionally, although the execution nodes shown in the example of FIG. 2 each include a single data cache and a single processor, in other examples, execution nodes can contain any number of processors and any number of caches. Also, the caches may vary in size among the different execution nodes.

In some examples, the virtual warehouses of the execution platform 210 operate on the same data, but each virtual warehouse has its own execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

Although virtual warehouses A, B, and C are illustrated with an association with the same execution platform 210, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 210 is coupled to data storage 204. The data storage 204 comprises multiple data storage devices 206-1 to 206-M. In some examples, the data storage devices 206-1 to 206-M are cloud-based storage devices located in one or more geographic locations. For example, the data storage devices 206-1 to 206-M may be part of a public cloud infrastructure or a private cloud infrastructure. The data storage devices 206-1 to 206-M may be hard disk drives (HDDs), solid state drives (SSDs), storage clusters, Amazon S3™ storage systems, or any other data storage technology. Additionally, the data storage 204 may include distributed file systems (e.g., Hadoop Distributed File Systems (HDFS)), object storage systems, and the like. In some examples, the storage devices 206-1 to 206-M are managed and provided by a third-party data storage platform (e.g., AWS®, Microsoft Azure Blob Storage®, or Google Cloud Storage®).

Each virtual warehouse can access any of the data storage devices 206-1 to 206-M shown in FIG. 2. Thus, the virtual warehouses are not necessarily assigned to a specific data storage device 206-1 to 206-M and, instead, can access data from any of the data storage devices 206-1 to 206-M within the data storage 204. Similarly, each of the execution nodes shown in FIG. 2 can access data from any of the data storage devices 206-1 to 206-M. In some examples, a particular virtual warehouse or a particular execution node may be temporarily assigned to a specific data storage device, but the virtual warehouse or execution node may later access data from any other data storage device.

In some examples, communication links between elements of the computing environment 200 are implemented via one or more data communication networks. These data communication networks may utilize any communication protocol and any type of communication medium. In some examples, the data communication networks are a combination of two or more data communication networks (or sub-networks) coupled to one another.

As shown in FIG. 2, the data storage devices 206-1 to 206-M are decoupled from the computing resources associated with the execution platform 210. This architecture supports dynamic changes to the cloud data platform 202 based on the changing data storage/retrieval needs, as well as the changing needs of the users and systems. The support of dynamic changes allows the cloud data platform 202 to scale quickly in response to changing demands on the systems and components within the cloud data platform 202. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operations, the cloud data platform 202 processes multiple jobs determined by the compute service manager 208. These jobs are scheduled and managed by the compute service manager 208 to determine when and how to execute the job. For example, the compute service manager 208 may divide the job into multiple discrete tasks and may determine what data is needed to execute each of the multiple discrete tasks. The compute service manager 208 may assign each of the multiple discrete tasks to one or more execution nodes of the execution platform 210 to process the task. The compute service manager 208 may determine what data is needed to process a task and further determine which nodes within the execution platform 210 are best suited to process the task. Some nodes may have already cached the data needed to process the task and, therefore, be a good candidate for processing the task. Metadata stored in the metadata data store 213 assists the compute service manager 208 in determining which nodes in the execution platform 210 have already cached at least a portion of the data needed to process the task. One or more nodes in the execution platform 210 processes the task using data cached by the nodes and, if necessary, data retrieved from the data storage 204.

The compute service manager 208, metadata data store 213, execution platform 210, and data storage 204 are shown in FIG. 2 as individual discrete components. However, each of the compute service manager 208, metadata data store 213, execution platform 210, and data storage 204 may be implemented as a distributed system (e.g., distributed across multiple systems/platforms at multiple geographic locations). Additionally, each of the compute service manager 208, metadata data store 213, execution platform 210, and data storage 204 can be scaled up or down (independently of one another) depending on changes to the requests received and the changing needs of the cloud data platform 202. Thus, in the described examples, the cloud data platform 202 is dynamic and supports regular changes to meet the current data processing needs.

As shown in FIG. 2, the computing environment 200 separates the execution platform 210 from the data storage 204. In this arrangement, the processing resources and cache resources in the execution platform 210 operate independently of the data storage devices 206-1 to 206-M in the data storage 204. Thus, the computing resources and cache resources are not restricted to specific data storage devices 206-1 to 206-M. Instead, all computing resources and all cache resources may retrieve data from and store data to any of the data storage resources in the data storage 204. A classification manager 228 manages operations related to performing join operations.

Figure 3:
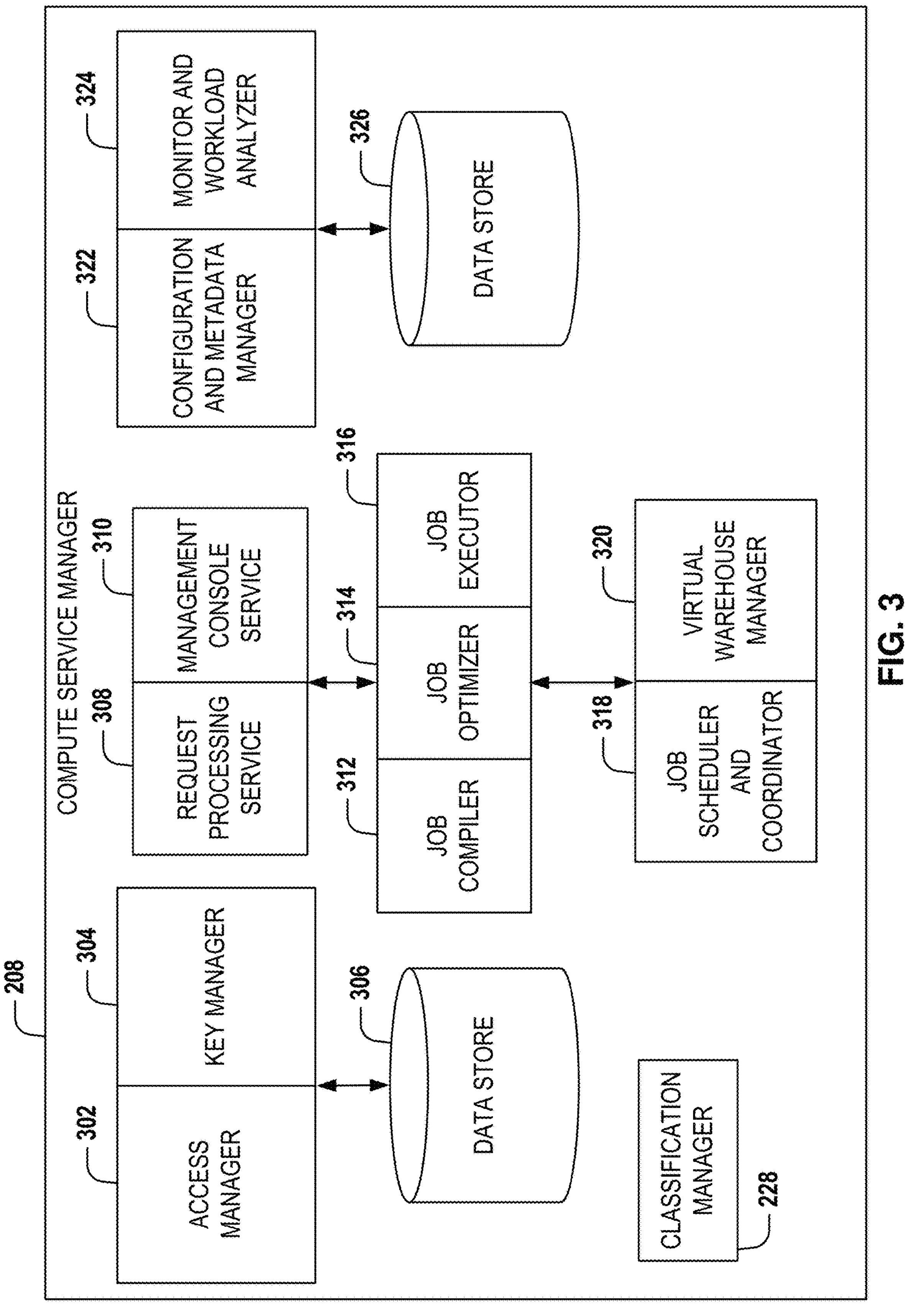
FIG. 3 is a block diagram illustrating components of a compute service manager of the cloud data platform, according to some examples.

FIG. 3 is a block diagram illustrating components of the compute service manager 208, also referred to herein as Global Services (GS), of the cloud data platform, according to some examples. As shown in FIG. 3, the compute service manager 208 includes an access manager 302 and a key manager 304 coupled to a data store 306 that stores access information. Access manager 302 handles authentication and authorization tasks for the systems described herein.

Key manager 304 manages the storage and authentication of keys used during authentication and authorization tasks. For example, access manager 302 and key manager 304 manage the keys used to access data stored in remote storage devices (e.g., data storage devices in data store 306).

A request processing service 308 manages received data storage requests and data retrieval requests (e.g., jobs to be performed on database data). For example, the request processing service 308 may determine the data necessary to process a received query (e.g., a data storage request or data retrieval request). The data may be stored in a cache within the execution platform 210 or in a data storage device in data store 306.

A management console service 310 supports access to various systems and processes by administrators and other system managers. Additionally, the management console service 310 may receive a request to execute a job and monitor the workload on the system.

The compute service manager 208 also includes a job compiler 312, a job optimizer 314, and a job executor 316. The job compiler 312 parses a job into multiple discrete tasks and generates the execution code for each of the multiple discrete tasks. The job optimizer 314 determines the best method to execute the multiple discrete tasks based on the data that needs to be processed. The job optimizer 314 also handles various data pruning operations and other data optimization techniques to improve the speed and efficiency of executing the job. The job executor 316 executes the execution code for jobs received from a queue or determined by the compute service manager 208.

A job scheduler and coordinator 318 sends received jobs to the appropriate services or systems for compilation, optimization, and dispatch to the execution platform 210. For example, jobs may be prioritized and processed in that prioritized order. In some examples, the job scheduler and coordinator 318 identifies or assigns particular nodes in the execution platform 210 to process particular tasks.

A virtual warehouse manager 320 manages the operation of multiple virtual warehouses implemented in the execution platform 210. As discussed below, each virtual warehouse includes multiple execution nodes that each of which includes a cache and a processor.

Additionally, the compute service manager 208 includes a configuration and metadata manager 322, which manages the information related to the data stored in the remote data storage devices and in the local caches (e.g., the caches in execution platform 210). The configuration and metadata manager 322 uses the metadata to determine which storage units need to be accessed to retrieve data for processing a particular task or job. A monitor and workload analyzer 324 oversees processes performed by the compute service manager 208 and manages the distribution of tasks (e.g., workload) across the virtual warehouses and execution nodes in the execution platform 210. The monitor and workload analyzer 324 also redistributes tasks, as needed, based on changing workloads throughout the cloud data platform 202 and may further redistribute tasks based on a user (e.g., "external") query workload that may also be processed by the execution platform 210. The configuration and metadata manager 322 and the monitor and workload analyzer 324 are coupled to a data store 326. Data store 326 in FIG. 3 represents any data repository or device within the cloud data platform 202. For example, data store 326 may represent caches in execution platform 210, storage devices in data store 306, the metadata data store 213, or any other storage device or system.

Figure 4:
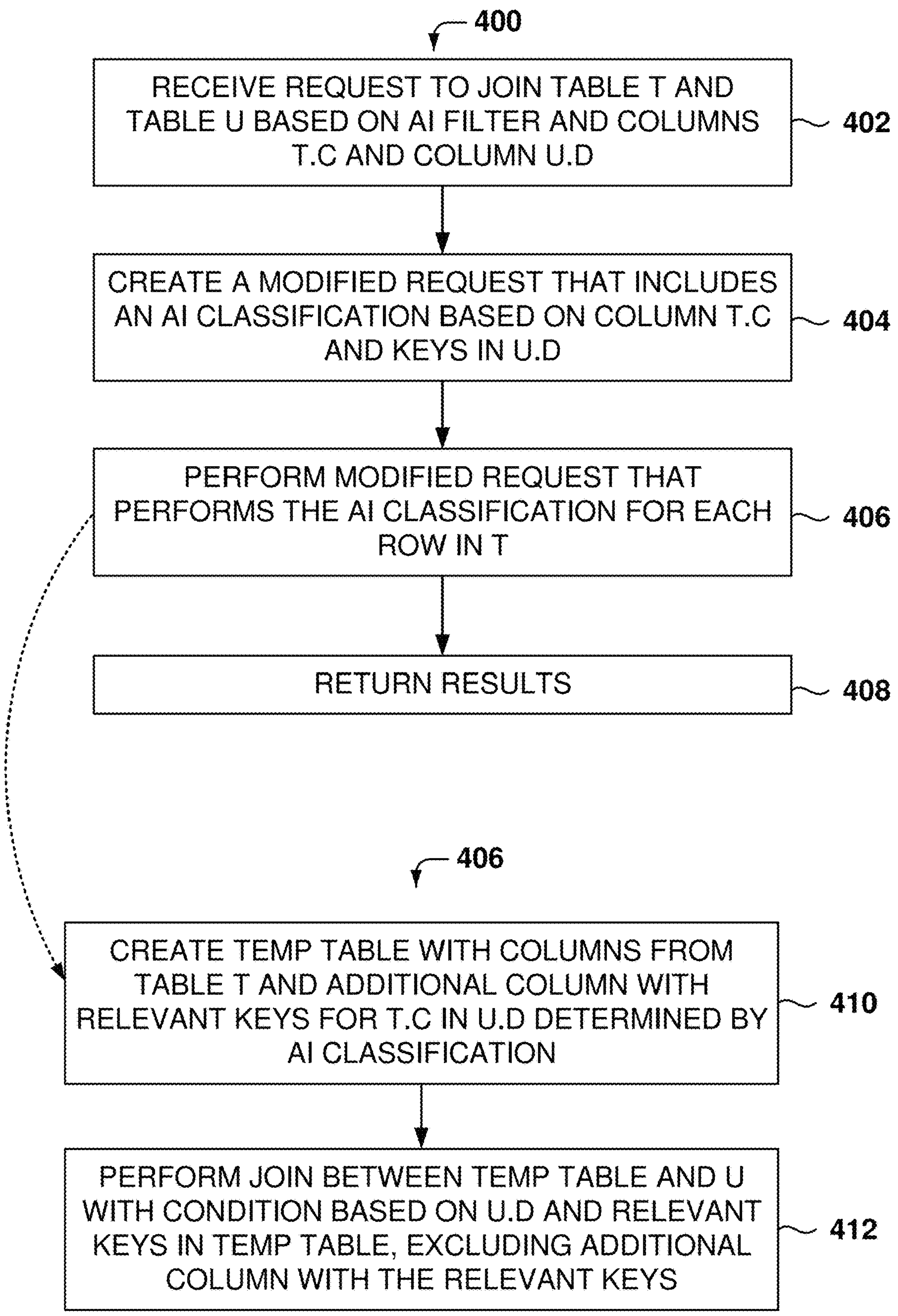
FIG. 4 is a flowchart of a method for transforming an AI join task into an AI classification process, according to some examples.

FIG. 4 is a flowchart of a method 400 for transforming an AI join task into an AI classification process, according to some examples. While the various operations in this flowchart are presented and described sequentially, one of ordinary skill will appreciate that some or all of the operations may be executed in a different order, be combined or omitted, or be executed in parallel.

The method 400 leverages an AI classification function to optimize the process of determining relationships between rows in two tables-referred to herein as table T and table U. Accordingly, the method 400 reframes the conventional join operation as a classification task, thereby reducing computational complexity and enabling efficient batch processing of potential matches. In some examples described below, an example table T is for articles, the column T.c refers to Articles.article, the table U is for labels, and the column U.d is for Labels.label.

At operation 402, a request is received to join a table T and a Table U based on an AI filter and columns T.c and column U.d for performing the join.

In one example, the user has provided the following query:

SELECT *
FROM T JOIN U ON AI_FILTER (prompt('does {0} exists in {1}', T.c, U.d))

The request is to perform a SQL join between tables T and U, using the AI_FILTER function as the join condition. In the request, T.c refers to column c from table T, and U.d refers to column d from table U. These columns are the specific fields from each table that are being compared by the AI_FILTER function to determine if a relationship exists between their values for each row pair. The AI_FILTER calls a Large Language Model (LLM) with the prompt "does {0} exists in {1}", substituting {0} for the value in T.c and {1} for the value in U.d for each row pair, and returning true or false to determine if the rows should be joined.

This request corresponds to the approach of using the join-with-AI-filter operation 106, as described above with reference to FIG. 1. This process requires checking every possible combination of rows from T and U, which can be computationally expensive.

From operation 402, the method 400 flows to operation 404 to create, by the cloud data platform, a modified request that includes an AI classification based on the column T.c and the values from column U.d, referred to as keys.

The modified request is created to generate a plan that can pass a multi-label list in multiple batches using a window function. A window function in SQL is a function that performs a calculation across a set of rows related to the current row, defined by a "window" specified in the 'OVER' clause. Unlike aggregate functions, which collapse rows into a single result, window functions keep all rows in the output and add an extra column with the computed value. The window can be divided into partitions (using 'PARTITION BY'), ordered (using 'ORDER BY), and framed to include specific rows relative to the current one. The window function is used to divide the sentiments into smaller batches, allowing each batch to fit within the context window of the language model.

Assuming for now that the tables have a relatively low number of rows, the query does not have to be fragmented, the modified request is rewritten as:

```
WITH left_filtered_w_right_join_key AS (
  SELECT
    T.*,
    AI_CLASSIFICATION ('. . . {0} . . . {1}', T.c,
  ALL_KEYS_IN_U_AS_LIST)
    as U_keys
  FROM T
)
SELECT L.*, U.* EXCLUDE U_keys
FROM left_filtered_w_right_join_key L
JOIN U ON (array_contains(U.d::variant, L.U_keys));
```

From operation 404, the method 400 flows to operation 406, where the cloud data platform performs the modified request that performs the AI classification for each row in table T.

From operation 406, the method 400 flows to operation 408, which includes returning the results of executing the modified request. The output comprises the relevant rows from table L and table U, as determined by the AI classification process, excluding values for column U_keys in the L table. This means that every column originally present in table T, as well as any additional columns created in the temporary table, are included in the output, except for column U_keys in the L table.

In this example, the operation 406 includes operation 410 and operation 412, corresponding to the operations defined in the modified request. At operation 410, corresponding to the WITH statement in the modified request, a CTE temporary table L named left_filtered_w_right_join_key is created with the columns from table T and an additional column that includes the relevant keys for the value of each row in T.c found in U.d as determined by the AI_CLASSIFICATION function.

The result is the temporary table left_filtered_w_right_join_key, which contains all columns from table T (represented by T.*), plus an additional column called U_keys. The U_keys column is generated by the AI_CLASSIFICATION function and contains, for each row in T, a set of relevant keys from U.d as determined by the AI model. Thus, the columns in the temporary table are the original columns from T and one new column containing the list of relevant keys U_keys for the row.

The AI classification function receives as input the values from a designated column T.c in table T along with a list of candidate identifiers from table U. The AI classification function evaluates the relationship between the current row of table T and each potential identifier in table U, allowing the AI model to process this combined input and determine which identifiers from table U are relevant to the current row in table T.

Operation 412, corresponding to the join statement in the modified request, performs the join between the temporary table and the table U with a condition based on U.d and the relevant keys in the temporary table, but excluding the additional column that includes the relevant keys.

Operation 412 performs a SQL join between the temporary table left_filtered_w_right_join_key (aliased as L) and table U. The join condition uses the function array_contains (U.d::variant, L.U_keys), which checks if the value in column U.d (cast to a variant type) exists within the array of relevant keys (U_keys) for each row in L.

The result of this query is a table that includes columns from L minus the U_keys column and the columns from U. Each row in the result represents a match where the value in U.d is found in the set of relevant keys determined by the AI classification for the corresponding row in T. This produces a joined output of the original data from T and U for all matches identified by the AI classification model.

By leveraging the AI model's capacity to process multiple identifiers in a single inference call, the method 400 minimizes the computational overhead typically associated with standard join operations.

The method 400 provides a significant improvement over traditional join operations by reducing the number of AI model calls from O(n×m) to O(n), where n is the number of rows in table T and m is the number of rows in table U.

Figure 5:
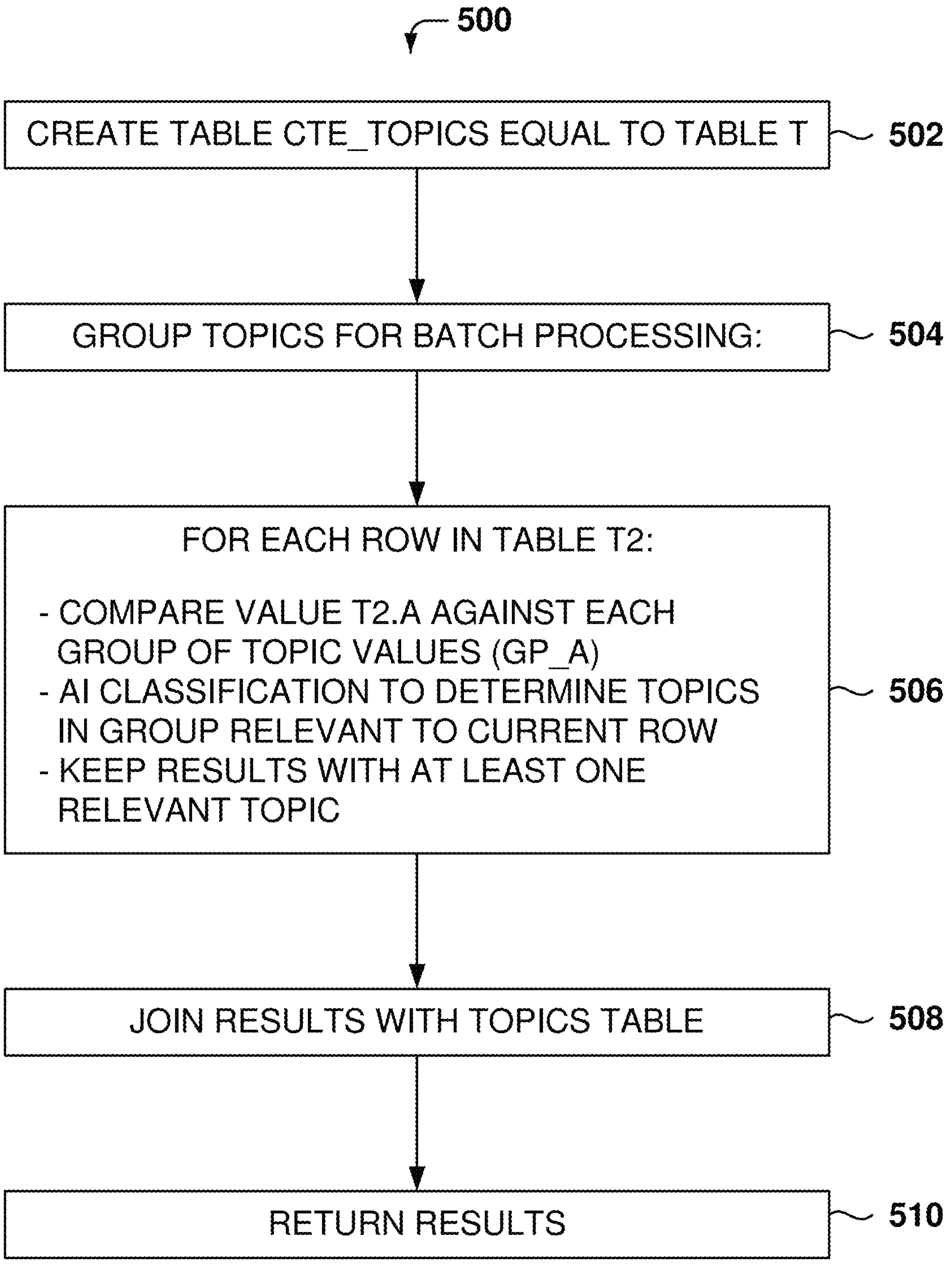
FIG. 5 is a flowchart of a method for performing AI classification by grouping topics for batch processing and determining relevant topics for each row in a dataset, according to some examples.

FIG. 5 is a flowchart of a method 500 for performing AI classification by grouping labels for batch processing and determining relevant labels for each row in a dataset, according to some examples. The method 500 performs the rewrite during optimization, which helps generate a plan that can pass a multi-label list in multiple batches using the window function. The equivalent query rewrite is as follows:

```
with cte_labels as
(
  select * From labels
),
cte as (
  with groups as (
    WITH numbered AS (
      SELECT
        a,
        ROW_NUMBER( ) OVER (ORDER BY a) AS row_number
      FROM (select distinct a from cte_labels) t1
    )
    SELECT
      FLOOR((row_number - 1) / 2) AS group_id, -- 2 is batch size
      ARRAY_AGG(a) AS gp_a
    FROM numbered
    GROUP BY group_id
  )
  select    articles.a, gp_a, array_intersection(    articles.a, gp_a) i_a --
  ai_classify
  from groups
  join articles
  where array_size(i_a) > 0
)
select L.a, t1.a
from cte L
join cte_labels on array_contains(t1.a, L.i_a)
;
generating groups:
FLOOR((row_number - 1) / 2) AS group_id, -- 2 is batch size
-- new query proposal when batch=1 (not sure how much benefit it would
  provide)
  with cte as (
  with groups as (
    select array_agg(distinct a) gp_a from t1
  )
  select articles.a, gp_a, array_intersection(articles.a, gp_a) i_a --
 ai_classify
  from groups
  join articles
  where array_size(i_a) > 0
)
select L.a, t1.a
from cte L
join t1 on array_contains(t1.a, L.i_a);
```

In this code, WITH is a SQL keyword used to define common table expressions (CTEs) for temporary result sets. Further, cte_labels is a CTE that selects all rows from the labels table, and cte is another CTE that uses nested CTEs, including groups, which organizes data for batch processing.

"WITH numbered AS" creates a temporary result set by assigning a unique row number to each distinct value from cte_labels. The CTE query is for an INNER join operation, and a different CTE query is used for an OUTER join operation.

This unique identifier is used to join results in the final output, with each branch passing the identifier to the join operation. The outer join code is reconstructed as a combination of inner and outer joins, where the top join represents the outer join and intermediate joins represent inner joins. In some examples, the unique identifier is generated for two scenarios: generating batches (applicable to a labels table and applicable for INNER and OUTER joins), and regenerating the output (applicable to Articles table and applicable for an OUTER join query only).

ROW_NUMBER( ) OVER (ORDER BY a) is a window function that generates sequential row numbers based on the order in column a. FLOOR((row_number−1)/2) calculates a group identifier for batching, with a batch size of two. ARRAY_AGG(a) aggregates values of a into an array for each group. array_intersection(articles.a, gp_a) is a function that returns the intersection of the value articles.a and the array gp_a, simulating an AI classification. Also, array_size (i_a) returns the number of elements in the intersection array i_a, and select L.a, t1.a from cte L join cte_labels on array_contains (t1.a, L.i_a) is a join operation that matches rows where the value t1.a is present in the intersection array L.i_a. The table array_contains checks if a value exists within an array. The second query uses array_agg(distinct a) to aggregate distinct values of a into an array, and otherwise repeats the same functions and terms as above.

At operation 502, the table CTE_LABELS is created by initializing the values with the values of table T. This operation prepares a temporary table that contains all rows from table T.

From operation 502, the method 500 flows to operation 504, where labels are grouped for batch processing. This includes assigning an identifier to each distinct label value and dividing these labels into groups of a fixed batch size (e.g., 2). Each group is aggregated into an array, referred to as gp_a. The batch size is determined based on constraints of the AI model, such as the maximum number of tokens that can be accommodated within the model's context window.

From operation 504, the method 500 flows to operation 506, where for each row in table articles, the value articles.a is compared against each group of label values gp_a. An AI classification function invoking the AI model is applied to determine which labels in the group are relevant to the current row. The AI model processes the input data and identifies the labels that match the context of the row in table articles, and the results with at least one relevant label are retained.

The results from the classification process are then joined with the labels table cte_labels at operation 508. This operation 508 reconstructs the relationships between the rows in table articles and the labels in table T, based on the classification results. The join condition ensures that only the relevant matches identified in the previous step are included in the final output.

The results are returned at operation 510, including the rows from table t1 along with the relevant labels from table articles, as determined by the AI classification process.

The method 500 provides a significant improvement over traditional join operations by leveraging AI classification to reduce computational complexity. By grouping labels for batch processing and applying the AI model to each batch, the method minimizes the number of AI model calls, enhancing applicability to large-scale data environments. Furthermore, the batching approach ensures that the AI model operates within the context window constraints of the model, improving performance and scalability.

Figure 6:
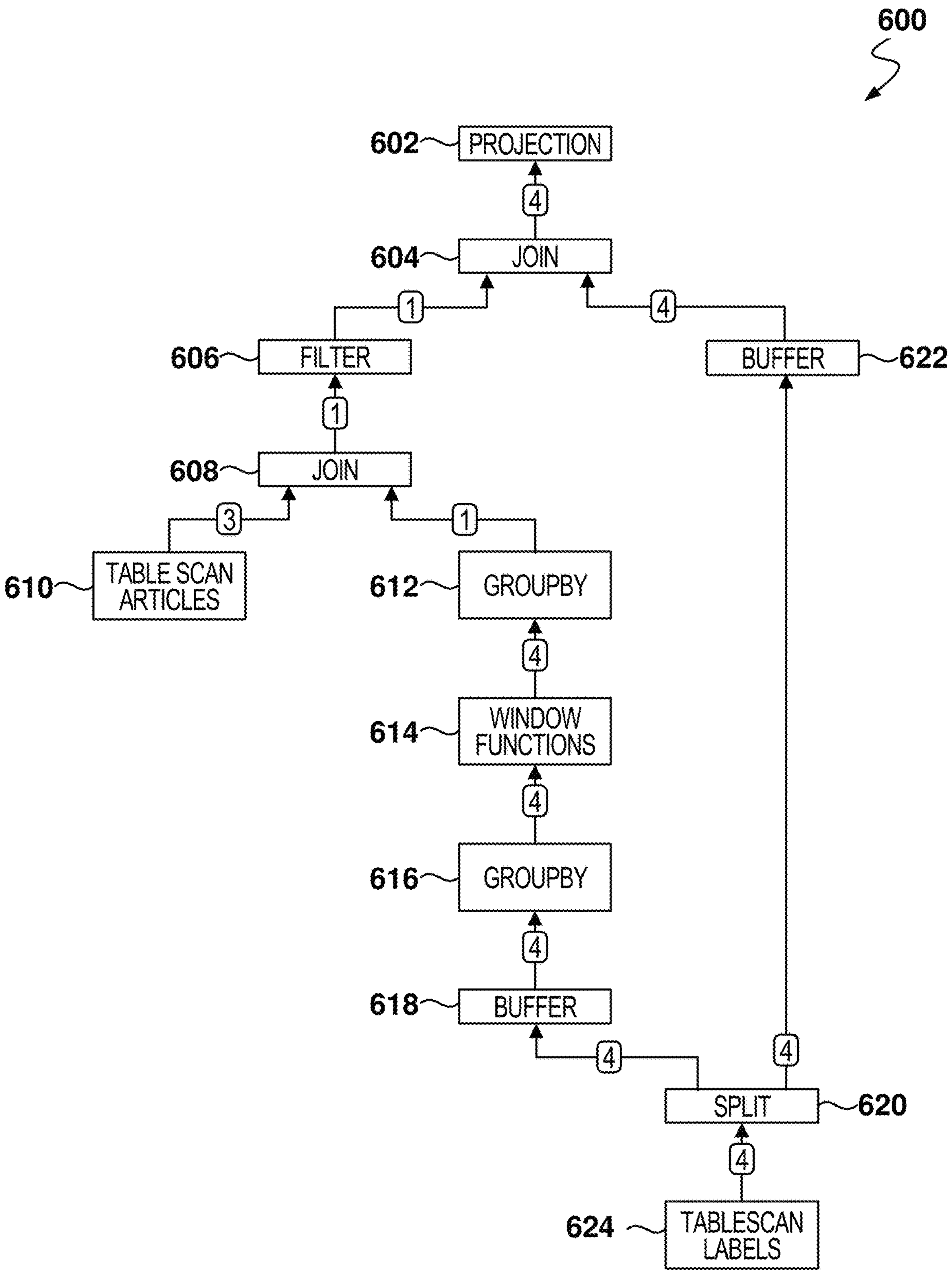
FIG. 6 is a graph illustrating the processing stages of an SQL query, according to some examples.

FIG. 6 is a graph 600 illustrating the processing stages of the SQL query, according to some examples. The graph 600 includes nodes representing significant operations in the query execution pipeline, such as Projection 602, Join 604, Filter 606, Join 608, GroupBy 612, WindowFunctions 614, GroupBy 616, Buffer 618, Split 620, Buffer 622, articles table 610, and labels table 624. Each node corresponds to a distinct stage in the query, and the connections between nodes indicate the flow of data and dependencies among operations.

The articles table 610 and the labels table 624 serve as source nodes, providing the input data for the query. The graph 600 structure illustrates how data from the articles table 610 is processed through a sequence of operations, including joins, filtering, grouping, and window functions, before being buffered and divided for batch processing. The labels table 624 is linked to the Split 620 node, highlighting its role as the source of classification targets.

Buffer 618 and buffer 622 are positioned to manage intermediate results and optimize data flow between stages. The graph 600 visually represents the orchestration of operations required to implement AI-driven classification within an SQL query, highlighting the relationships and dependencies between Projection 602, Join 604, Filter 606, Join 608, GroupBy 612, WindowFunctions 614, GroupBy 616, Buffer 618, Split 620, Buffer 622, articles table 610, and labels table 624. This structure enables efficient execution and resource management for large-scale data environments.

Figure 7:
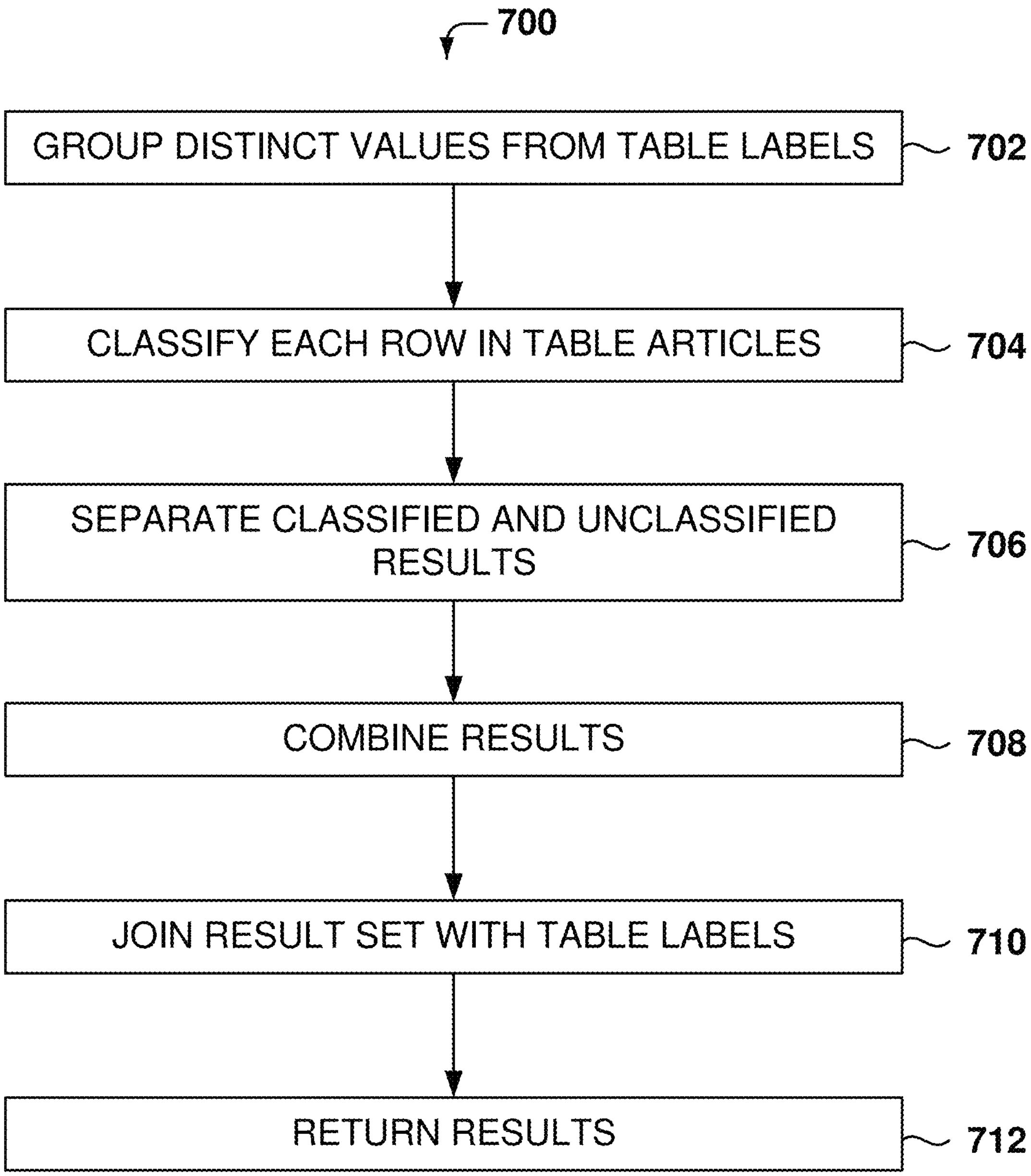
FIG. 7 is a flowchart of a method for transforming an outer join task into an AI classification process, according to some examples.

FIG. 7 is a flowchart of a method 700 for transforming an outer join task into an AI classification process, according to some examples. One example code for the method 700 is as follows:

```
with cte as (
  with groups as (
    WITH numbered AS (
      SELECT
      a,
        ROW_NUMBER( ) OVER (ORDER BY a) AS row_number
      FROM (select distinct a from labels) labels
    )
    SELECT
      FLOOR((row_number − 1) / 2) AS group_id, -- 2 is batch size
      ARRAY_AGG(a) AS gp_a
    FROM numbered
    GROUP BY group_id
  )
  select articles.a, gp_a, array_intersection(articles.a, gp_a) i_a --
 ai_classify
  from articles left join groups
),
cte_not_null as (
  select
    a, gp_a, i_a
  from cte where array_size(i_a) > 0
),
cte_null_ranked as (
  select
    a, gp_a, i_a,
    ROW_NUMBER( ) OVER (ORDER BY a) as rn
  from cte
  where true
    and array_size(i_a) = 0
    and a not in (select a from cte_not_null)
),
cte_ua as (
  -- Get all the rows where AI_CLASSIFY produced some result
  select a, gp_a, i_a From cte_not_null
```

-continued

```
)
   union all
   -- Get those rows where no match is found from the label.
   -- Due to branching, we would have multiple entries in RS; therefore,
  filter
   to keep one.
   select a, gp_a, i_a from cte_null_ranked where rn = 1
)
select L.a, labels.a
from cte_ua L
left join labels on array_contains(labels.a, L.i_a)
;
```

In this code, a is a column representing a value (such as a topic label) from table labels or articles. ROW_NUMBER( ) OVER (ORDER BY a) is a window function that assigns a unique sequential number to each row, ordered by the value of column a, and row_number is the output of the ROW_NUMBER( ) function, used to identify and group rows. FLOOR ((row_number−1)/2) is a mathematical function that calculates the group_id for batching, with a batch size of two for this example, and group_id is an integer identifier for each batch group, derived from the row_number. ARRAY_AGG(a) is an aggregation function that collects values of a into an array for each group, and gp_a is the array of grouped values a, created by ARRAY_AGG.

Further, array_intersection (articles.a, gp_a) is a function that returns the intersection between the value articles.a and the array gp_a, simulating AI classification, and i_a is the intersection array, representing the relevant matches between articles.a and gp_a. Also, array_size (i_a) is a function that returns the number of elements in the intersection array i_a, rn is a row number assigned to unclassified rows in cte_null_ranked, used for filtering, and cte is a common table expression (CTE) that contains the results of joining articles with groups and calculating intersections.

Also, cte_not_null is a CTE containing rows from cte where the intersection array i_a is not empty (i.e., matches were found), cte_null_ranked is a CTE containing rows from cte where the intersection array i_a is empty (i.e., no matches), and assigns a row number rn for filtering. In addition, cte_ua is a CTE that combines classified results from cte_not_null and one representative unclassified row from cte_null_ranked, array_contains (labels.a, L.i_a) is a function that checks if the value labels.a exists within the intersection array L.i_a, L.a is the value a from the left side of the join (cte_ua), and labels.a is the value a from table labels, used in the final join condition.

Operation 702 includes grouping distinct values from table labels. In operation 702, entries in a specified column of table labels that do not repeat are identified and organized into groups, which are aggregated into arrays. Operation 702 includes assigning a unique row number to each distinct value in column a from table labels, dividing these values into groups of a fixed batch size (in this example, the batch size is 2), and for each group, aggregating the values into an array (gp_a).

From operation 702, the method 700 flows to operation 704, which includes classifying each row in table articles against the grouped values from table labels. In operation 704, the AI classification function evaluates the relationship between each row of table articles and the grouped values. The AI model is invoked to determine which values in the group are relevant to the current row in table articles, and the classification results are stored, including the original row, the group array, and the intersection of relevant values. Operation 704 includes, for each row in table articles, compare its value (articles.a) against each group of values (gp_a), use an AI classification function (instanced as array_intersection) to determine which values in the group are relevant to the current row in articles, and store the results, including the original value, the group array, and the intersection array (i_a).

From operation 704, the method 700 flows to operation 706, which includes separating the results into classified and unclassified categories. Rows for which the classification process identified relevant matches are categorized as classified results, while rows with no matches are categorized as unclassified results. For unclassified rows, additional processing may be performed to ensure that the unclassified rows are represented in the final output. This includes identifying rows where the intersection array (i_a) is not empty; these are rows where the AI classification found relevant matches, identifying rows where the intersection array is empty and the value does not appear in the previously classified results, and assigning a unique rank to each of these unclassified rows.

From operation 706, the method 700 flows to operation 708, which includes combining the classified and unclassified results into a unified result set. Operation 708 ensures that all rows from table articles are included in the output, regardless of whether the rows were classified or unclassified. Operation 708 includes creating a unified result set that includes all rows where AI classification found matches, and one representative row for each value where no matches were found (to ensure all possible values are included).

From operation 708, the method 700 flows to operation 710, which includes joining the unified result set with table labels. The join operation reconstructs the relationships between rows in table articles and the original values in table labels. For each row in the unified result set, operation 710 includes performing a left join with table labels where the value in labels.a is present in the intersection array (i_a), and outputting the relevant columns from both tables.

From operation 710, the method 700 flows to operation 712, which includes returning the results of the join operation. The output includes the relevant rows from both table labels and table articles, as determined by the AI classification process.

The method 700 provides a significant improvement over conventional join operations by leveraging AI classification to reduce the number of model calls and optimize resource utilization. By separating classified and unclassified results and combining them in a unified result set, the method 700 is suitable for deployment in large-scale data environments.

Figure 8:
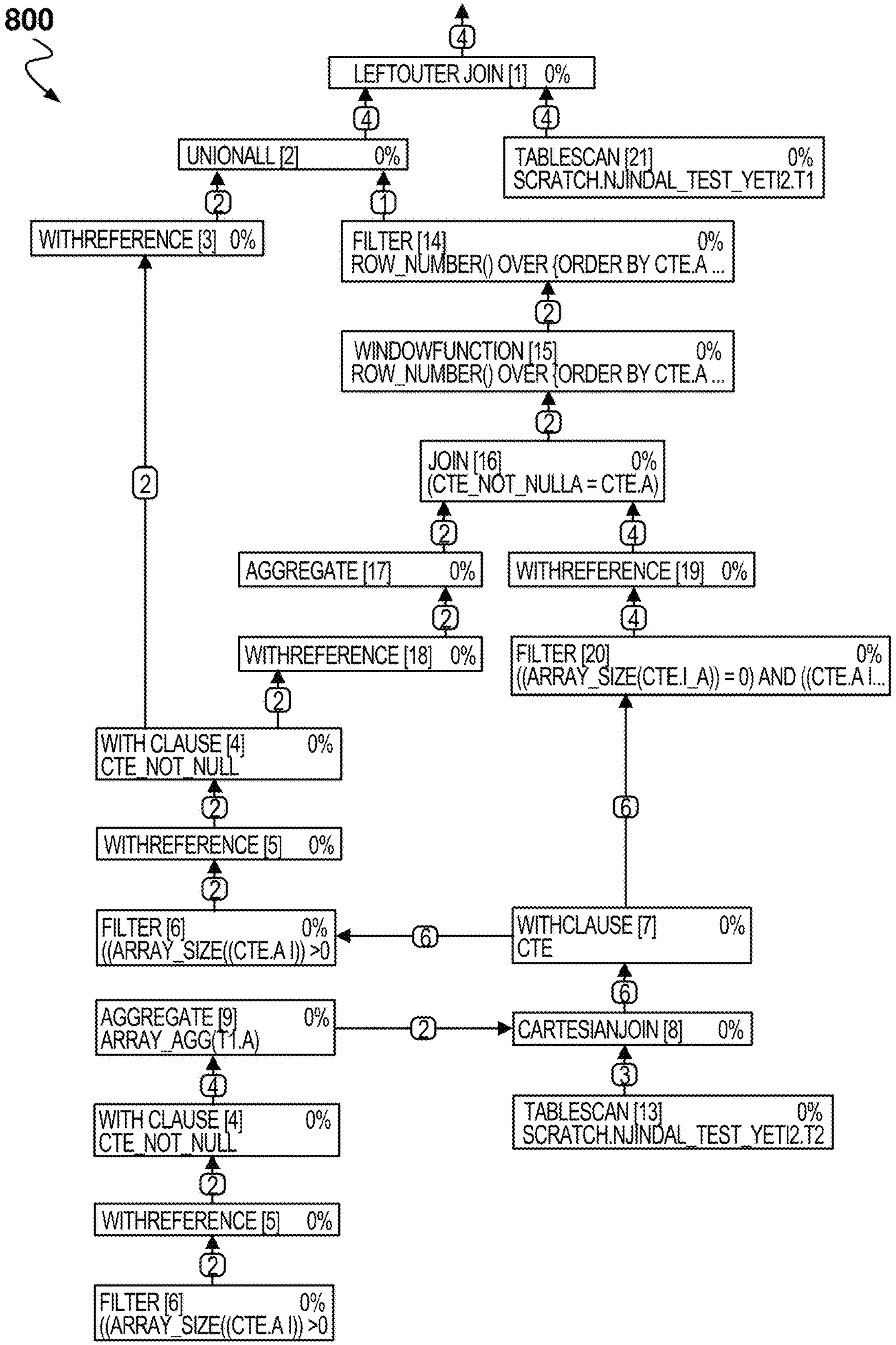
FIG. 8 is a graph for the execution of an SQL query with AI-driven optimizations, according to some examples.

FIG. 8 is a graph 800 for the execution of an SQL query with AI-driven optimizations, according to some examples. In this approach, some rows match with sentiments, resulting in review rows that correspond to at least one sentiment, while other review rows do not match any sentiment. The process includes identifying all rows that match at least one sentiment and using a separate branch of code to find all rows that do not match any sentiments.

When generating multiple batches in an inner join query, each review row appears x times, where x is the number of sentiment batches. For review rows that do not match any sentiments, x rows are generated with no sentiments, but the original left outer join query should only produce one output per review. The code addresses this by using the left side to generate the necessary rows, and then merging review rows that appear multiple times into a single row. The process uses a tree structure to reconstruct the output, with a union operation producing the final result and a final node assembling the output. This method ensures that duplicate rows are not produced and that the outer join output is retained by generating and merging rows as needed.

The graph 800 includes nodes representing significant operations in the query execution plan, such as LeftOuterJoin [1], UnionAll [2], TableScan [21], WithReference [3], Filter [14], WindowFunction [15], Join [16], Aggregate [17], WithReference [18], Filter [20], WithClause [4], WithReference [5], Filter [6], WithClause [7], CartesianJoin [8], Aggregate [9], TableScan [13], WindowFunction [10], Aggregate [11], and TableScan [12]. These nodes are connected to illustrate the flow of data and dependencies between operations.

The graph 800 highlights how AI-driven optimizations are incorporated into the query execution plan. For example, nodes such as Filter [14] and WindowFunction [15] can be used to apply AI-based predicates and batch processing, while Aggregate [17] and CartesianJoin [8] support grouping and joining operations that benefit from classification-based transformations. The presence of multiple WithReference and WithClause nodes demonstrates the use of intermediate results and common table expressions to facilitate efficient computation and reuse of data.

Overall, the graph 800 visually represents the structure and dependencies of an optimized SQL query execution plan, showing how various operations are orchestrated to leverage AI-driven techniques for improved performance and scalability in large-scale data environments.

Figure 9:
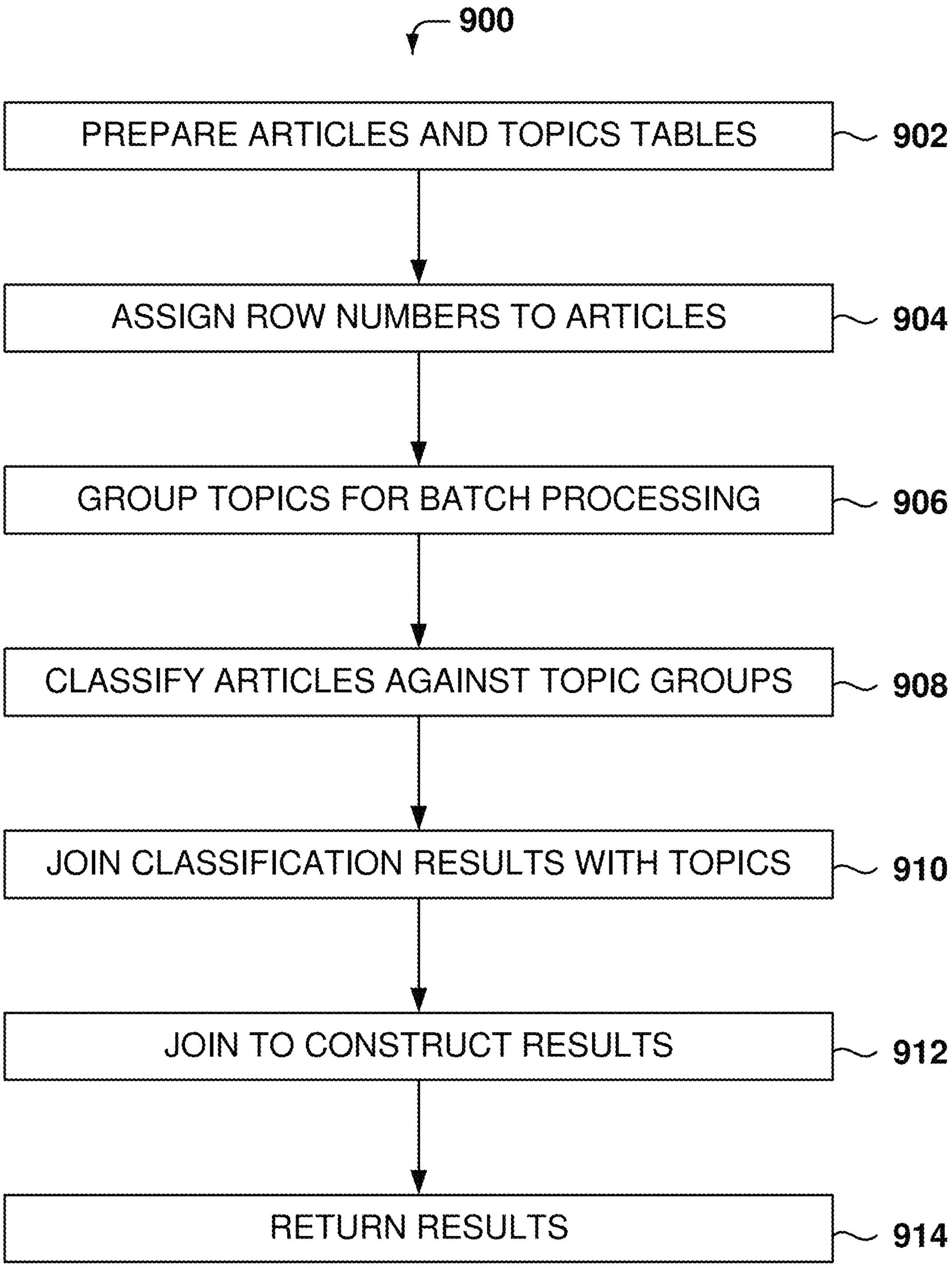
FIG. 9 is a flowchart of a method for transforming an outer join task into an AI classification process using an inner join and an outer join, according to some examples.

FIG. 9 is a flowchart of a method 900 for transforming an outer join task into an AI classification process using an inner join and an outer join, according to some examples. One example code for implementing method 900 includes the following:

```
with articles_cte as (
   select * from article
),
topics_cte as (
   select * From topics
),
articles_windows_cte as (
   select
      *, ROW_NUMBER( ) OVER (ORDER BY RANDOM( )) as rn
   from articles_cte
),
inner_top_join_cte as (
   with inner_bottom_join_cte as (
      with groups as (
         with numbered as (
            select
               a,
               ROW_NUMBER( ) OVER (ORDER BY a) as rowNum
            from (select distinct a from topics_cte) t1
         )
         select
            FLOOR((rowNum -1) / 2) as group_id,
            array_agg(a) as gp_a
         from numbered
         group by group_id
      )
      select
         t2 .* ,
         snowflake.cortex.ai_classify(prompt('({0} contains this country',
t2.a),
         gp_a):'labels' labels,
         array_size(labels) _size
      from
         groups t1
         join articles_windows_cte t2
         where array_size(labels) > 0
   )
   select t1.a article_a, t1.rn rn, t2.a labels
```

-continued

```
   )
   From inner_bottom_join_cte t1 join topics_cte t2 on
   array_contains(t2.a::variant, t1.labels)
)
select t1.a article_a, t2.labels
from articles_windows_cte t1
   left join inner_top_join_cte t2 on t1.rn=t2.rn
;
```

In this code, articles_cte is a common table expression (CTE) containing all rows from the article table, topics_cte is a CTE containing all rows from the topics table, and articles_windows_cte is a CTE that adds a unique row number (rn) to each article using ROW_NUMBER( ) OVER (ORDER BY RANDOM( )). Also, ROW_NUMBER( ) OVER (ORDER BY RANDOM( )) is a window function that assigns a unique sequential number to each row in a random order. Further, rn is the row number assigned to each article in articles_windows_cte, inner_top_join_cte is a CTE that contains the results of joining inner_bottom_join_cte with topics_cte, and inner_bottom_join_cte is a nested CTE that processes groups of topics and classifies articles. In addition, groups is a CTE that organizes distinct topic values into batches, numbered is a CTE that assigns a unique row number (rowNum) to each distinct topic value a, and a is a column representing a topic label from topics_cte or t1.

Further yet, ROW_NUMBER( ) OVER (ORDER BY a) is a window function that assigns a unique sequential number to each distinct topic value a, and rowNum is the row number assigned to each topic value in numbered. FLOOR((rowNum−1)/2) is a mathematical function that calculates the group_id for batching, with a batch size of two, group_id is an integer identifier for each batch group, derived from rowNum, array_agg (a) is An aggregation function that collects topic values a into an array for each group, and gp_a is The array of grouped topic values a, created by array_agg.

Additionally, "snowflake.cortex.ai_classify (prompt(' ({0} contains this country', t2.a), gp_a) is 'labels' labels" is an AI classification function that takes a prompt and a batch of topic labels, returning the relevant labels for each article, labels is the array of topic labels returned by the AI classification function for each article, array_size (labels) is a function that returns the number of elements in the labels array, and _size is the number of relevant labels found for each article.

Also, t2 represents rows from articles_windows_cte in the join, and t1 represents rows from groups or inner_bottom_join_cte in the join. Further, article_a is the value a from the article side of the join, array_contains (t2.a is isvariant, t1.labels) is a function that checks if the value t2.a (cast as a variant type) exists within the labels array t1.labels, labels (in select t1.a article_a, t1.rn rn, t2.a labels) is the topic labels associated with each article, and labels (in select t1.a article_a, t2.labels) is the topic labels associated with each article in the final output.

Operation 902 includes preparing the articles table and the topics table. The articles table includes textual data entries, and the topics table includes categorical labels that serve as classification targets for the articles. This includes creating a temporary table (articles_cte) containing all rows from the article table, and creating another temporary table (topics_cte) containing all rows from the topics table.

From operation 902, the method 900 flows to operation 904, which includes assigning row numbers to articles. A new table articles_windows_cte is created that includes all articles and assigns a unique row number (rn) to each article, using a random order.

From operation 904, the method 900 flows to operation 906, which includes grouping topics for batch processing. The topics in the topics table are divided into batches, with each batch aggregated into an array. The batch size is determined based on constraints of the AI model, such as the maximum number of tokens that can be processed within the model's context window. Operation 906 includes assigning a unique row number to each distinct topic value in the topics_cte table, dividing the topics into groups of a fixed batch size (in this example, the batch size is 2), and, for each group, aggregating the topic values into an array (gp_a).

From operation 906, the method 900 flows to operation 908, which includes classifying articles against topic groups. For each article, an AI classification function is invoked to evaluate the relationship between the article and each topic group. The AI model processes the article's content along with the batched topics and determines which topics are relevant to the article. The results of operation 908 include the article identifier, the topic group, and the specific topics deemed relevant.

From operation 908, the method 900 flows to operation 910, which includes joining classification results with topics. The classification results are joined with the original topics table (topics_cte), where the topic value is present in the labels array. Also, the relevant columns are selected as output, including the article identifier and the matched topic labels.

From operation 910, the method 900 flows to operation 912, which includes joining to construct results. The articles table is joined with the classification results, using the row numbers assigned in operation 904 to align articles with their corresponding classification results. Operation 912 includes performing a left join between the original articles (with row numbers) and the classification results, matching on the row number (rn), and outputting the article identifier and the associated topic labels for each article. This join reconstructs the comprehensive relationships between articles and topics.

From operation 912, the method 900 flows to operation 914, which includes returning results. The output includes the articles along with their associated topics, as determined by the AI classification process, and is structured to facilitate further analysis or integration into downstream applications.

Figure 10:
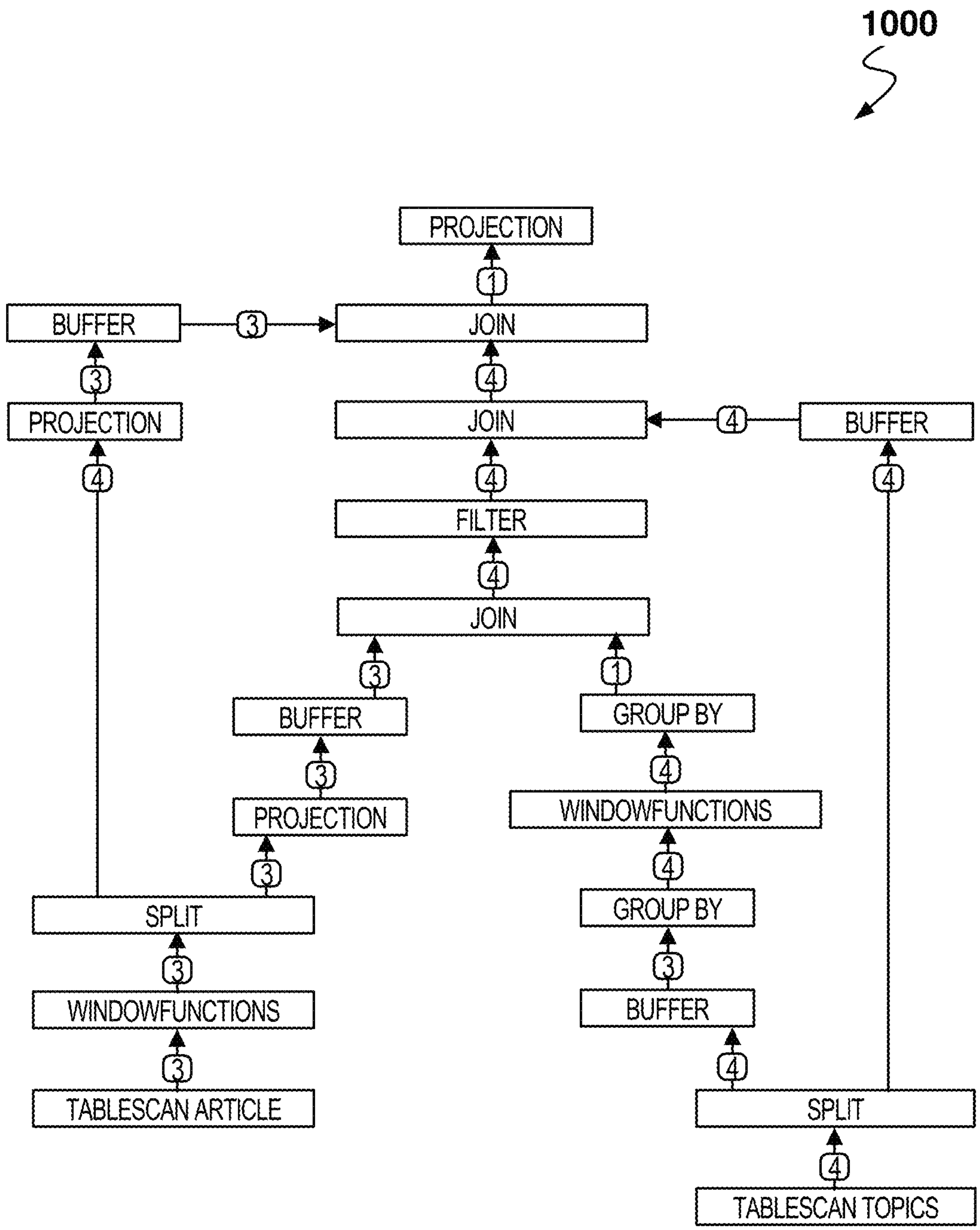
FIG. 10 is a graph for transforming an SQL query into an optimized classification task, according to some examples.

FIG. 10 is a graph 1000 for transforming an SQL query into an optimized classification task, according to some examples. The graph 1000 visually represents the relationships and dependencies between operations, with nodes corresponding to distinct stages in the query transformation and edges indicating the flow of data between these stages. The graph 1000 provides a detailed representation of how article and topic data are processed, batched, grouped, classified, and joined to achieve an optimized classification task within an SQL query.

At the top of the graph 1000, a projection node receives the output of a join node, which serves as the central aggregation point for the results of two branches. The left branch of the graph 1000 begins with a TableScan Article node, which reads the article data from the underlying table. The data flows to a WindowFunctions node, where the row number assigned to the article is used to reconstruct the output since it is used in a top most join node. From the WindowFunctions node, the data is split into batches by a split node, enabling efficient processing within the constraints of the AI model's context window. The batched data is then passed to a projection node, which selects relevant columns for further processing, and subsequently to a buffer node, which temporarily stores the processed batches to optimize data flow and resource utilization.

The right branch of the graph 1000 starts with a TableScan Topics node, which reads the topic or label data. The data flows to a split node, where topics are divided into manageable batches. These batches are buffered by a buffer node to support parallel and staged processing. The buffered topic batches are then aggregated by a GroupBy node, which collects topics into arrays for classification. The grouped data is processed by a WindowFunctions node, which assigns identifiers to each topic group, and then further aggregated by another GroupBy node to refine the grouping structure before joining.

Both branches converge at a join node, where the batched articles and grouped topics are aligned based on their assigned identifiers. The output of this join node flows to a filter node, which applies classification criteria to eliminate irrelevant matches and retain those article-topic pairs that meet the AI-driven classification requirements. The filtered results are then joined again at another join node to reconstruct the relationships between articles and topics, ensuring that the final output reflects the optimized classification.

Throughout the graph 1000, buffer nodes are used to manage intermediate results and facilitate efficient data movement between stages. Projection nodes select and format the necessary columns for each operation. The data flow between nodes is orchestrated to maximize batching efficiency, minimize the number of AI model calls, and support scalable query execution.

Figure 11:
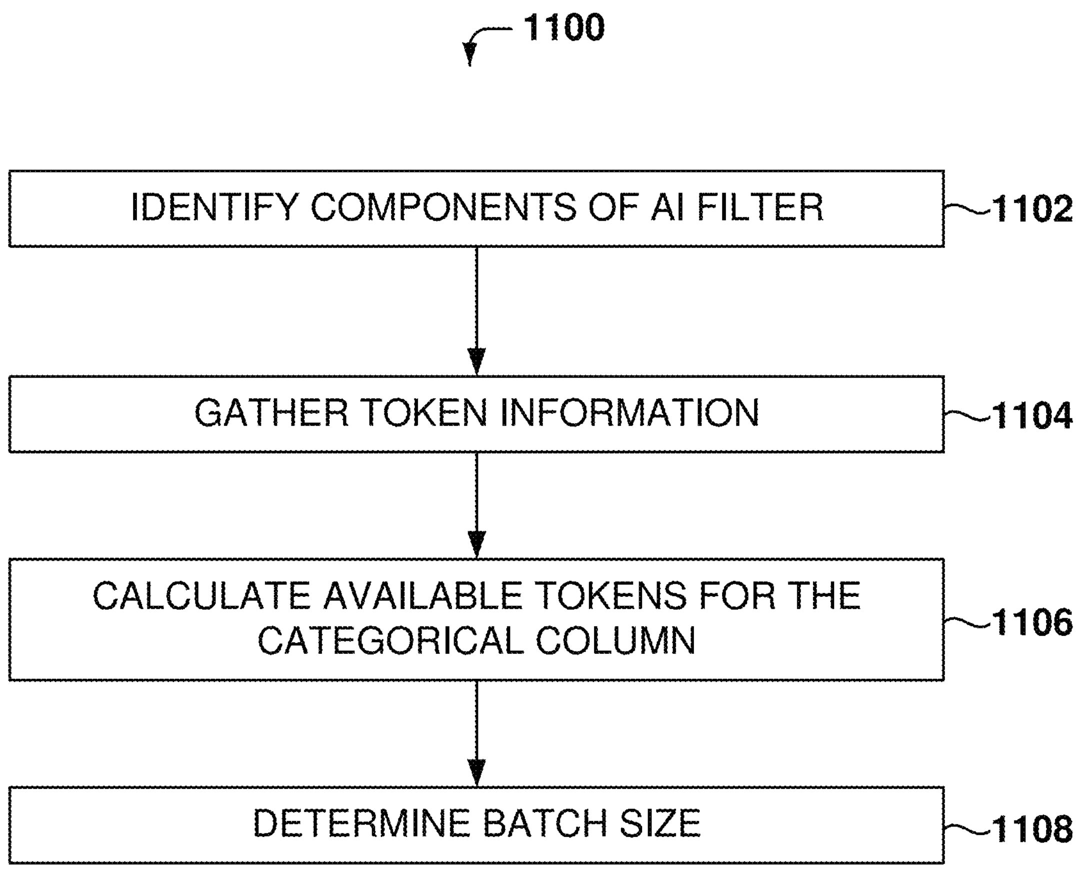
FIG. 11 is a flowchart of a method for determining the batch size, according to some examples.

FIG. 11 is a flowchart of a method 1100 for determining the batch size, according to some examples. While the various operations in this flowchart are presented and described sequentially, one of ordinary skill will appreciate that some or all of the operations may be executed in a different order, be combined or omitted, or be executed in parallel.

In some applications, such as classifying medical codes, there could be thousands of hierarchical condition codes, so it may not be possible to perform the AI filtering in one shot, and the request has to be broken into batches. The approach is applicable not only to labeling cases but also to problems for matching columns between tables. Experimental evaluation shows that this transformation yields improvements in cases beyond simple labeling.

In some examples, the parameters used for batch size calculation include fixed information reserved for the function, system reserved tokens, and the number of tokens calculated for the user-provided prompt. The topics parameter corresponds to the categorical column, and the maximum number of tokens is calculated for both the categorical and non-categorical columns, which are then used to determine the batch size.

The batch size is reduced based on the context window, and the determination is made dynamically or adaptively depending on the data in the tables. The batch size varies for different queries or underlying tables, so the system calculates the batch size adaptively. Sentiment batches are generated, and each batch is joined with the review on the left side. The AI classifier is then used to determine which sentiments apply to each review. The output is reconstructed by rejoining with the sentiment table to match the original output format. The final join represents this reconstruction. A window function is introduced to generate the adaptive batch size. If only one batch is needed, the window function is omitted and a group-by operation is used instead.

At operation 1102, the components of the AI filter are identified. The AI filter prompt is generated to determine the structural elements and the expressions being referenced, such as a categorical column representing the data to be classified and an additional column or expression that provides context for the classification task.

In analyzing an AI filter, such as AI_FILTER(prompt('{0} is {1}', X, Y), the elements are broken down into several components. The prompt expression, '{0} is {1}' defines the prompt input structure. Within this formulation, the topics expression refers to the categorical column intended for classification, represented as X. Concurrently, the other expression relates to the remaining column that features within the prompt, denoted as Y.

From operation 1102, the method flows to operation 1104, which includes gathering token information. In some examples, the token information includes the following tokens:

CWS=Context Window Tokens;

SR=System Reserved Tokens;

PET=Prompt Expression Tokens, e.g., the number of tokens in the prompt expression;

OEMT=Other Expression Maximum Tokens, e.g., the number of maximum tokens in the other expression; and THMT=Topic Hint Maximum Tokens, e.g., the number of maximum tokens in the topics hint.

From operation 1104, the method flows to operation 1106, which includes calculating the available tokens for the categorical column. In some examples, the number of Available Context Window Tokens (ACWT) that can be allocated to the categorical column is calculated as:

$$ACWT=(CWS-SR-PET-OEMT)$$

From operation 1106, the method flows to operation 1108, which includes determining the batch size. In operation 1108, the batch size is calculated by dividing the ACWT by the THMT required for each topic hint, ensuring that the batch size fits within the large language model's context window.

Figure 12:
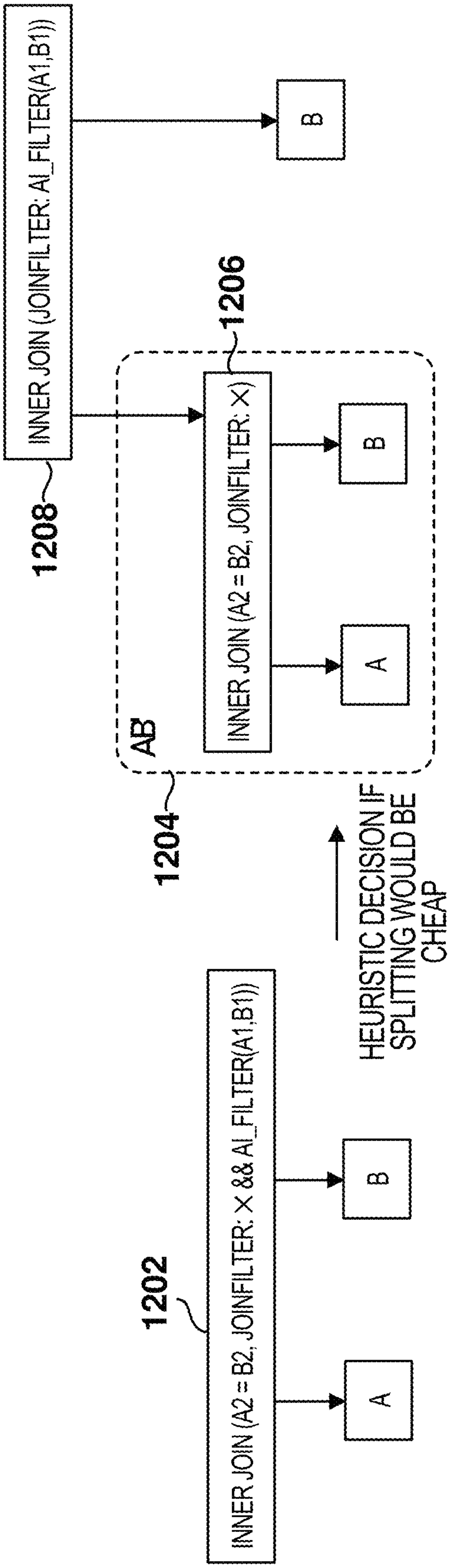
FIG. 12 is a block diagram illustrating the transformation of join operations using heuristic-based splitting for optimized query execution, according to some examples.

FIG. 12 is a block diagram illustrating the transformation of join operations using heuristic-based splitting for optimized query execution, according to some examples.

More complex queries can be formed utilizing other join keys and join filters. These complex queries are simplified by transforming AI potential joins into AI Joins by splitting them. For complex joins, the approach includes splitting the join into multiple joins by dividing the join into several components and applying the transformation to each, thereby constructing the query plan to accommodate the transformation.

For example, an original join 1202 is defined as follows:

Inner Join (a2=b2, AI_Filter(a1, b1))

A

B

The structure described is similar to the example described in FIG. 1, but changing the conversion of the sentiment column B into an article or review structure. This results in a subtree of a join rather than a tree. The overall plan remains the same, but the sentiment column is replaced with a join node that includes both the article and the sentiment, reflecting the intended structure.

The original join 1202 includes a composite join condition combining a traditional join filter (a2=b2) and an AI-based filter AI_Filter (a1, b1) applied to datasets A and B. The AI-based filter AI_Filter (a1, b1) includes invoking a large language model to evaluate contextual relationships between columns a1 and b1.

A heuristic decision is made to determine if splitting the join operation would be computationally efficient. If the heuristic indicates that splitting is advantageous, the query is split into two different joins.

For example, the original join 1202 is rewritten as two different joins, join 1206 and join 1208, as follows:

Inner Join (AI_FILTER (a1, b1)) ○ Inner Join (a2=b2).

A

B

B

The join 1206 is an Inner join (a2=b2), JoinFilter, x) and includes applying the traditional join filter a2=b2 independently to datasets A and B, producing an intermediate result 1204, referred to as AB'.

The join 1208 is Inner join (JoinFilter: AI_Filter (a1, b1)), which includes applying the AI-based filter AI_Filter (a1, b1) to the intermediate result 1204. This targeted application of the AI-based filter AI_Filter (a1, b1) ensures that the rows already satisfying the traditional join condition are evaluated by the large language model, reducing the number of AI model calls required.

By explicitly separating the operations and applying the AI-based filter AI_Filter (a1, b1) only after the traditional join filter a2=b2, the system achieves improved resource utilization and enhanced query execution speed. The splitting helps in constructing an AI Join candidate which will applicable for an AI Join to classification transformation and, therefore, after applying the transformation there will be an efficient LLM call. This approach is particularly advantageous in large-scale data environments where the cost of AI model calls is significant.

Figure 13:
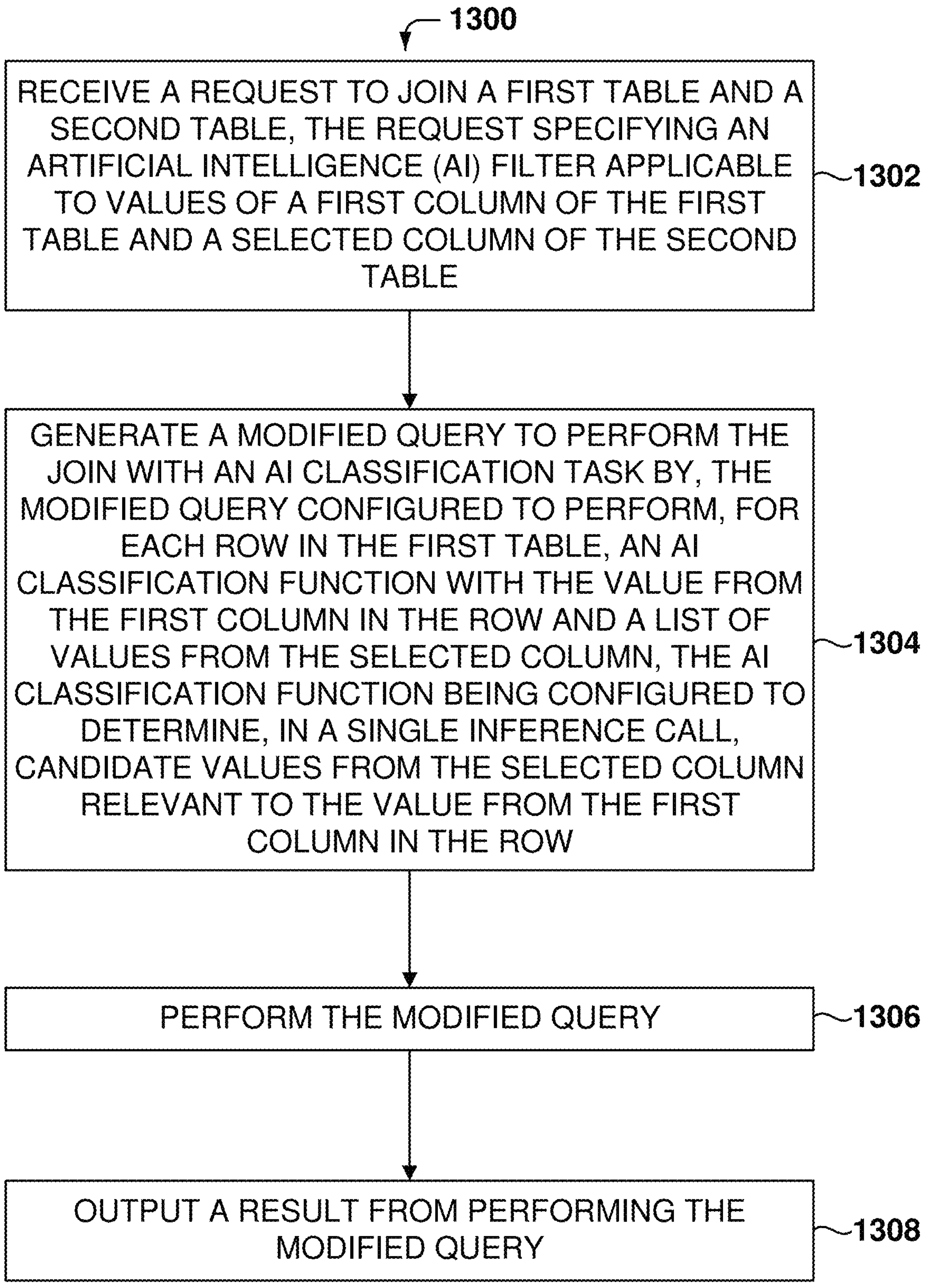
FIG. 13 is a flowchart of a method for transforming an AI join task to an AI classification task, according to some examples.

FIG. 13 is a flowchart of a method 1300 for transforming an AI join task to an AI classification task, according to some examples. While the various operations in this flowchart are presented and described sequentially, one of ordinary skill will appreciate that some or all of the operations may be executed in a different order, be combined or omitted, or be executed in parallel.

Operation 1302 includes receiving a request to join a first table and a second table, the request specifying an artificial intelligence (AI) filter applicable to values of a first column of the first table and a selected column of the second table.

From operation 1302, the method 1300 flows to operation 1304, which includes generating a modified query to perform the join with an AI classification task. The modified query is configured to perform, for each row in the first table, an AI classification function with the value from the first column in the row and a list of values from the selected column. The AI classification function is configured to determine, in a single inference call, candidate values from the selected column that are relevant to the value from the first column in the row. This transformation reframes the join operation as a classification problem, enabling the system to batch multiple candidate values and evaluate them in a single model inference call rather than performing separate calls for each pair of rows.

From operation 1304, the method 1300 flows to operation 1306, which includes performing the modified query. This operation applies the AI classification function to the rows in the first table and processes the classification results to identify relevant matches between the first table and the second table. The execution reduces the number of AI model calls required, as the classification function processes multiple candidate values in a single call.

From operation 1306, the method 1300 flows to operation 1308, which includes outputting a result from performing the modified query. The output includes the relevant rows from the first table and the second table, as determined by the AI classification process. The results are structured to reflect the relationships identified by the classification function, thereby providing the output of the join operation.

In view of the disclosure above, various examples are set forth below. It should be noted that one or more features of an example, taken in isolation or in combination, should be considered within the disclosure of this application.

Example 1. A system comprising one or more computer processors and a memory comprising instructions that, when executed by the one or more computer processors, cause the system to perform operations comprising: receiving a request to join a first table and a second table, the request specifying an artificial intelligence (AI) filter applicable to values of a first column of the first table and a selected column of the second table; generating a modified query to perform the join with an AI classification task by, the modified query configured to perform, for each row in the first table, an AI classification function with the value from the first column in the row and a list of values from the selected column, the AI classification function being configured to determine, in a single inference call, candidate values from the selected column that are relevant to the value from the first column in the row; performing the modified query; and outputting a result from performing the modified query.

Example 2. The system of Example 1, wherein the modified query further includes creating a temporary table comprising columns from the first table and an additional column containing, for each row, a set of relevant candidate values from the selected column as determined by the AI classification function; and performing a join between the temporary table and the second table by matching each candidate value in the selected column to the set of relevant candidate values in the additional column of the temporary table while excluding the additional column.

Example 3. The system of any one or more of Examples 1-2, wherein the instructions further cause the one or more computer processors to perform operations comprising generating the list of values from the selected column by aggregating all distinct values in the selected column.

Example 4. The system of any one or more of Examples 1-3, wherein the instructions further cause the one or more computer processors to perform operations comprising determining that a number of values in the list of values from the selected column exceeds a context window of the AI classification function; and splitting the list of values from the selected column into a plurality of batches, each batch sized configured to fit within the context window of the AI classification function.

Example 5. The system of any one or more of Examples 1-4, wherein the instructions further cause the one or more computer processors to perform operations comprising determining a size of each batch based on a maximum number of tokens that the AI classification function is configured to process, a size of the list of values, and a number of system-reserved tokens.

Example 6. The system of any one or more of Examples 1-5, wherein the instructions further cause the one or more computer processors to perform operations comprising calculating available context window tokens for the AI classification function by subtracting system-reserved tokens and prompt expression tokens from a total context window size.

Example 7. The system of any one or more of Examples 1-6, wherein generating the modified query further comprises transforming a complex join operation by splitting the complex join operation into a plurality of simpler joins, including a join based on traditional join keys and a join based on the AI classification function.

Example 8. The system of any one or more of Examples 1-7, wherein the instructions further cause the one or more computer processors to perform operations comprising sampling a subset of rows from the second table; and determining that the selected column of the second table contains categorical data suitable for batching based on values, of the sampled subset of rows, representing categorical labels.

Example 9. The system of any one or more of Examples 1-8, wherein the AI classification function is configured to process textual data in the first column and categorical data in the selected column.

Example 10. The system of any one or more of Examples 1-9, wherein the modified query invokes the AI classification function a number of times equal to a number of rows in the first table, wherein the request to join the first table and the second table requires invoking the AI filter a number of times equal to the number of rows in the first table times a number of rows in the second table.

Example 11. A computer-implemented method comprising receiving a request to join a first table and a second table, the request specifying an artificial intelligence (AI) filter applicable to values of a first column of the first table and a selected column of the second table; generating a modified query to perform the join with an AI classification task by, the modified query configured to perform, for each row in the first table, an AI classification function with the value from the first column in the row and a list of values from the selected column, the AI classification function being configured to determine, in a single inference call, candidate values from the selected column that are relevant to the value from the first column in the row; performing the modified query; and outputting a result from performing the modified query.

Example 12. The method of Example 11, wherein the modified query further includes creating a temporary table comprising columns from the first table and an additional column containing, for each row, a set of relevant candidate values from the selected column as determined by the AI classification function; and performing a join between the temporary table and the second table by matching each candidate value in the selected column to the set of relevant candidate values in the additional column of the temporary table while excluding the additional column.

Example 13. The method of any one or more of Examples 11-12, further comprising generating the list of values from the selected column by aggregating all distinct values in the selected column.

Example 14. The method of any one or more of Examples 11-13, further comprising determining that a number of values in the list of values from the selected column exceeds a context window of the AI classification function; and splitting the list of values from the selected column into a plurality of batches, each batch sized configured to fit within the context window of the AI classification function.

Example 15. The method of any one or more of Examples 11-14, further comprising determining a size of each batch based on a maximum number of tokens that the AI classification function is configured to process, a size of the list of values, and a number of system-reserved tokens.

Example 16. A machine-storage medium including instructions that, when executed by a machine, cause the machine to perform operations comprising receiving a request to join a first table and a second table, the request specifying an artificial intelligence (AI) filter applicable to values of a first column of the first table and a selected column of the second table; generating a modified query to perform the join with an AI classification task by, the modified query configured to perform, for each row in the first table, an AI classification function with the value from the first column in the row and a list of values from the selected column, the AI classification function being configured to determine, in a single inference call, candidate values from the selected column that are relevant to the value from the first column in the row; performing the modified query; and outputting a result from performing the modified query.

Example 17. The machine-storage medium of Example 16, wherein the modified query further includes creating a temporary table comprising columns from the first table and an additional column containing, for each row, a set of relevant candidate values from the selected column as determined by the AI classification function; and performing a join between the temporary table and the second table by matching each candidate value in the selected column to the set of relevant candidate values in the additional column of the temporary table while excluding the additional column.

Example 18. The machine-storage medium of any one or more of Examples 16-17, wherein the machine further performs operations comprising generating the list of values from the selected column by aggregating all distinct values in the selected column.

Example 19. The machine-storage medium of any one or more of Examples 16-18, wherein the machine further performs operations comprising determining that a number of values in the list of values from the selected column exceeds a context window of the AI classification function; and splitting the list of values from the selected column into a plurality of batches, each batch sized configured to fit within the context window of the AI classification function.

Example 20. The machine-storage medium of any one or more of Examples 16-19, wherein the machine further performs operations comprising determining a size of each batch based on a maximum number of tokens that the AI classification function is configured to process, a size of the list of values, and a number of system-reserved tokens.

Figure 14:
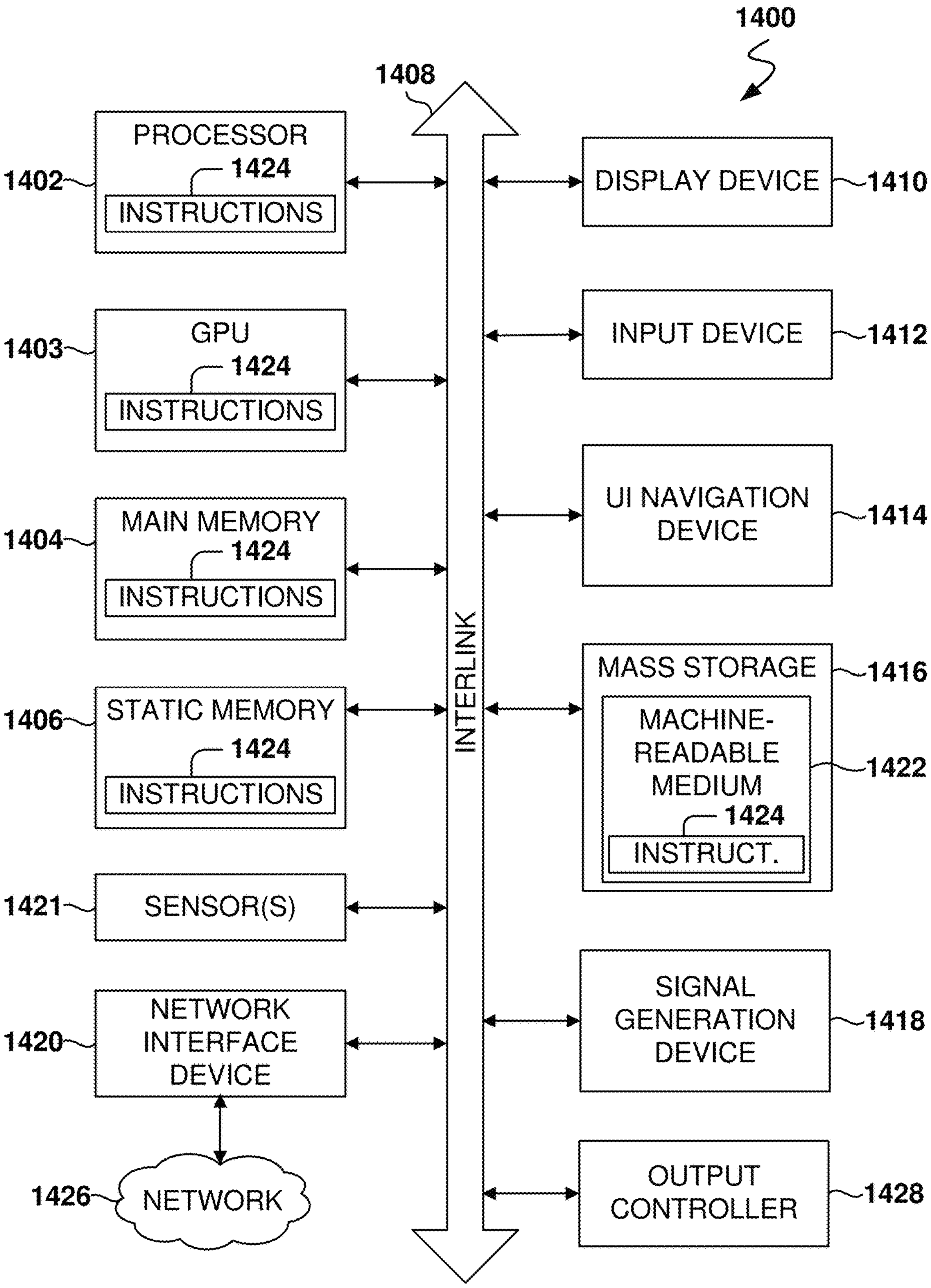
FIG. 14 is a block diagram illustrating an example of a machine upon by which one or more process examples described herein may be implemented or controlled.

FIG. 14 is a block diagram illustrating an example of a machine 1400 upon by which one or more process examples described herein may be implemented or controlled. In alternative examples, the machine 1400 may operate as a standalone device or be connected (e.g., networked) to other machines. In a networked deployment, the machine 1400 may operate in the capacity of a server machine, a client machine, or both in server-client network environments. In an example, the machine 1400 may act as a peer machine in a peer-to-peer (P2P) (or other distributed) network environment. Further, while only a single machine 1400 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as recited herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1400 (e.g., computer system) may include a hardware processor 1402 (e.g., a central processing unit (CPU), a hardware processor core, or any combination thereof), a graphics processing unit (GPU 1403), a main memory 1404, and a static memory 1406, some or all of which may communicate with each other via an interlink 1408 (e.g., bus). The machine 1400 may further include a display device 1410, an alphanumeric input device 1412 (e.g., a keyboard), and a user interface (UI) navigation device 1414 (e.g., a mouse). In an example, the display device 1410, alphanumeric input device 1412, and UI navigation device 1414 may be a touch screen display. The machine 1400 may additionally include a mass storage device 1416 (e.g., drive unit), a signal generation device 1418 (e.g., a speaker), a network interface device 1420, and one or more sensors 1421, such as a Global Positioning System (GPS) sensor, compass, accelerometer, or another sensor. The machine 1400 may include an output controller 1428, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1402 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1402 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio- Frequency Integrated Circuit (RFIC), a Neuromorphic Processor, a Quantum Processor, or any combination thereof.

The processor 1402 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1402 may be emulated in software, running on a physical processor, as a virtual processor or virtual circuit. The virtual processor may behave like an independent processor but is implemented in software rather than hardware.

The mass storage device 1416 may include a machine-readable medium 1422 on which one or more sets of data structures or instructions 1424 (e.g., software) embodying or utilized by any of the techniques or functions described herein. The instructions 1424 may also reside, completely or at least partially, within the main memory 1404, within the static memory 1406, within the hardware processor 1402, or the GPU 1403 during execution thereof by the machine 1400. For example, one or any combination of the hardware processor 1402, the GPU 1403, the main memory 1404, the static memory 1406, or the mass storage device 1416 may constitute machine-readable media.

While the machine-readable medium 1422 is illustrated as a single medium, the term "machine-readable medium" may include a single medium or multiple media (e.g., a centralized or distributed database and associated caches and servers) configured to store one or more instructions 1424.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 1424 for execution by the machine 1400 and that causes the machine 1400 to perform any one or more of the techniques of the present disclosure or that is capable of storing, encoding, or carrying data structures used by or associated with such instructions 1424. Non-limiting machine-readable medium examples may include solid-state memories and optical and magnetic media. For example, a massed machine-readable medium comprises a machine-readable medium 1422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 1424 may be transmitted or received over a communications network 1426 using a transmission medium via the network interface device 1420. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1424 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A cloud data platform comprising:
one or more computer processors; and
a memory comprising instructions that, when executed by the one or more computer processors, cause the cloud data platform to perform operations comprising:
receiving a request to join a first table and a second table of a database system, the request specifying an artificial intelligence (AI) filter applicable to values of a first column of the first table and a selected column of the second table;
generating, by the cloud data platform, a modified database query to perform the join with an AI classification function;
performing, by the cloud data platform, the modified database query, the performing of the modified database query comprising:
creating a prompt, by the cloud data platform, for each row in the first table based on the AI classification function, the value from the first column in the row, and a list of values from the selected column, the AI classification function being configured to determine, in a single inference call, candidate values from the selected column that are relevant to the value from the first column in the row; and
providing, by the cloud data platform, for each row in the first table, the created prompt to a large language model (LLM), the LLM returning a result of applying the AI classification function for the row, the result comprising the candidate values from the selected column that are relevant to the value from the first column in the row;
combining the result of applying the AI classification function for all the rows from performing the modified database query to obtain a request result; and
outputting the request result from performing the modified query that includes the join of the first table and the second table of the database system.

2. The cloud data platform as recited in claim 1, wherein performing the modified database query further includes:
creating a temporary table comprising columns from the first table and an additional column containing, for each row, a set of relevant candidate values from the selected column as determined by the AI classification function; and
performing a join between the temporary table and the second table by matching each candidate value in the selected column to the set of relevant candidate values in the additional column of the temporary table while excluding the additional column.

3. The cloud data platform as recited in claim 1, wherein the instructions further cause the one or more computer processors to perform operations comprising:
generating the list of values from the selected column by aggregating all distinct values in the selected column.

4. The cloud data platform as recited in claim 1, wherein the instructions further cause the one or more computer processors to perform operations comprising:
determining that a number of values in the list of values from the selected column exceeds a context window of the AI classification function;
calculating a batch size based on a maximum number of tokens that the LLM can process; and
splitting the list of values from the selected column into a plurality of batches according to the batch size.

5. The cloud data platform as recited in claim 4, wherein the instructions further cause the one or more computer processors to perform operations comprising:
determining a size of each batch based on a maximum number of tokens that the AI classification function is configured to process, a size of the list of values, and a number of system-reserved tokens.

6. The cloud data platform as recited in claim 4, wherein the instructions further cause the one or more computer processors to perform operations comprising:
calculating available context window tokens for the AI classification function by subtracting system-reserved tokens and prompt expression tokens from a total context window size.

7. The cloud data platform as recited in claim 1, wherein generating the modified database query further comprises:
transforming a complex join operation by splitting the complex join operation into a plurality of simpler joins, including a join based on traditional join keys and a join based on the AI classification function.

8. The cloud data platform as recited in claim 1, wherein the instructions further cause the one or more computer processors to perform operations comprising:
sampling a subset of rows from the second table; and
determining that the selected column of the second table contains categorical data suitable for batching based on values, of the sampled subset of rows, representing categorical labels.

9. The cloud data platform as recited in claim 1, wherein the AI classification function is configured to process textual data in the first column and categorical data in the selected column.

10. The cloud data platform as recited in claim 1, wherein the modified database query invokes the AI classification function a number of times equal to a number of rows in the first table, wherein the request to join the first table and the second table requires invoking an AI filter a number of times equal to the number of rows in the first table times a number of rows in the second table.

11. The cloud data platform as recited in claim 1, wherein generating the modified database query further comprises:
applying a heuristic to sample the first table and determine if the first column contains categorical values; and generating the modified database query based on the first column containing categorical values.

12. A method implemented by a cloud data platform, the method comprising:

receiving a request to join a first table and a second table of a database system, the request specifying an artificial intelligence (AI) filter applicable to values of a first column of the first table and a selected column of the second table;

generating, by the cloud data platform, a modified database query to perform the join with an AI classification function;

performing, by the cloud data platform, the modified database query, the performing of the modified database query comprising:

creating a prompt, by the cloud data platform, for each row in the first table based on the AI classification function, the value from the first column in the row, and a list of values from the selected column, the AI classification function being configured to determine, in a single inference call, candidate values from the selected column that are relevant to the value from the first column in the row; and providing, by the cloud data platform, for each row in the first table, the created prompt to a large language model (LLM), the LLM returning a result of applying the AI classification function for the row, the result comprising the candidate values from the selected column that are relevant to the value from the first column in the row;

combining the result of applying the AI classification function for all the rows from performing the modified database query to obtain a request result; and outputting the request result from performing the modified query that includes the join of the first table and the second table of the database system.

13. The method as recited in claim 12, wherein performing the modified database query further includes:

creating a temporary table comprising columns from the first table and an additional column containing, for each row, a set of relevant candidate values from the selected column as determined by the AI classification function; and performing a join between the temporary table and the second table by matching each candidate value in the selected column to the set of relevant candidate values in the additional column of the temporary table while excluding the additional column.

14. The method as recited in claim 12, further comprising:

generating the list of values from the selected column by aggregating all distinct values in the selected column.

15. The method as recited in claim 12, further comprising:

determining that a number of values in the list of values from the selected column exceeds a context window of the AI classification function;

calculating a batch size based on a maximum number of tokens that the LLM can process; and splitting the list of values from the selected column into a plurality of batches according to the batch size.

16. The method as recited in claim 15, further comprising:

determining a size of each batch based on a maximum number of tokens that the AI classification function is configured to process, a size of the list of values, and a number of system-reserved tokens.

17. A machine-storage medium including instructions that, when executed by a cloud data platform, cause the cloud data platform to perform operations comprising:

receiving a request to join a first table and a second table of a database system, the request specifying an artificial intelligence (AI) filter applicable to values of a first column of the first table and a selected column of the second table;

generating, by the cloud data platform, a modified database query to perform the join with an AI classification function;

performing, by the cloud data platform, the modified database query, the performing of the modified database query comprising:

creating a prompt, by the cloud data platform, for each row in the first table based on the AI classification function, the value from the first column in the row, and a list of values from the selected column, the AI classification function being configured to determine, in a single inference call, candidate values from the selected column that are relevant to the value from the first column in the row; and providing, by the cloud data platform, for each row in the first table, the created prompt to a large language model (LLM), the LLM returning a result of applying the AI classification function for the row, the result comprising the candidate values from the selected column that are relevant to the value from the first column in the row;

combining the result of applying the AI classification function for all the rows from performing the modified database query to obtain a request result; and outputting the request result from performing the modified query that includes the join of the first table and the second table of the database system.

18. The machine-storage medium as recited in claim 17, wherein performing the modified database query further includes:

creating a temporary table comprising columns from the first table and an additional column containing, for each row, a set of relevant candidate values from the selected column as determined by the AI classification function; and performing a join between the temporary table and the second table by matching each candidate value in the selected column to the set of relevant candidate values in the additional column of the temporary table while excluding the additional column.

19. The machine-storage medium as recited in claim 17, wherein the cloud data platform further performs operations comprising:

determining that a number of values in the list of values from the selected column exceeds a context window of the AI classification function;

calculating a batch size based on a maximum number of tokens that the LLM can process; and splitting the list of values from the selected column into a plurality of batches according to the batch size.

20. The machine-storage medium as recited in claim 17, wherein the cloud data platform further performs operations comprising:

determining a size of each batch based on a maximum number of tokens that the AI classification function is configured to process, a size of the list of values, and a number of system-reserved tokens.

* * * * *